United States Patent
Albrecht et al.

(10) Patent No.: US 12,479,103 B1
(45) Date of Patent: Nov. 25, 2025

(54) AUTOMATED FASTENER SYSTEM AND METHOD HAVING FASTENER CONDUCTIVITY TESTING

(71) Applicant: The Boeing Company, Arlington, VA (US)

(72) Inventors: Mark E. Albrecht, Lake Stevens, WA (US); Monica J. Brockway, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/671,954

(22) Filed: May 22, 2024

(51) Int. Cl.
| | | |
|---|---|---|
| *B25J 9/16* | (2006.01) | |
| *B23P 19/00* | (2006.01) | |
| *B64F 5/60* | (2017.01) | |
| *G01N 27/04* | (2006.01) | |

(52) U.S. Cl.
CPC ........... *B25J 9/1687* (2013.01); *B23P 19/007* (2013.01); *B64F 5/60* (2017.01); *G01N 27/041* (2013.01); *B23P 2700/01* (2013.01)

(58) Field of Classification Search
CPC ... B25J 9/1687; B23P 19/007; B23P 2700/01; B64F 5/60; G01N 27/041; G01N 27/90
See application file for complete search history.

(56) References Cited

U.S. PATENT DOCUMENTS

2011/0209589 A1   9/2011   Ota et al.
2020/0363342 A1   11/2020  Nygaard et al.

FOREIGN PATENT DOCUMENTS

RU          198572 U1      7/2020

OTHER PUBLICATIONS

European Patent Office Extended European Search Report dated Sep. 18, 2025, for counterpart EP application 25166693.9, Applicant The Boeing Company, 9 pages.

*Primary Examiner* — Lee A Holly

(57) ABSTRACT

There is provided an automated fastener system having fastener conductivity testing. The automated fastener system has an automated fastener holder assembly holding fastener(s); an automated fastener shuttle assembly having shuttle cup(s); an automated fastener inspection system having an inspection center shaft, and inspection gripper fingers; an automated delivery system having a delivery device; an automated fastener installation system having an end effector with an end effector center shaft, and end effector gripper fingers; an automated eddy current conductivity probe system; and a processing system. The eddy current conductivity probe system has an eddy current conductivity probe assembly integrated in one of, the one or more shuttle cups, the inspection center shaft, the inspection gripper fingers, the end effector center shaft, or the end effector gripper fingers. The eddy current conductivity probe assembly contacts a selected fastener to perform the fastener conductivity testing, and to obtain an electrical conductivity measurement.

20 Claims, 17 Drawing Sheets

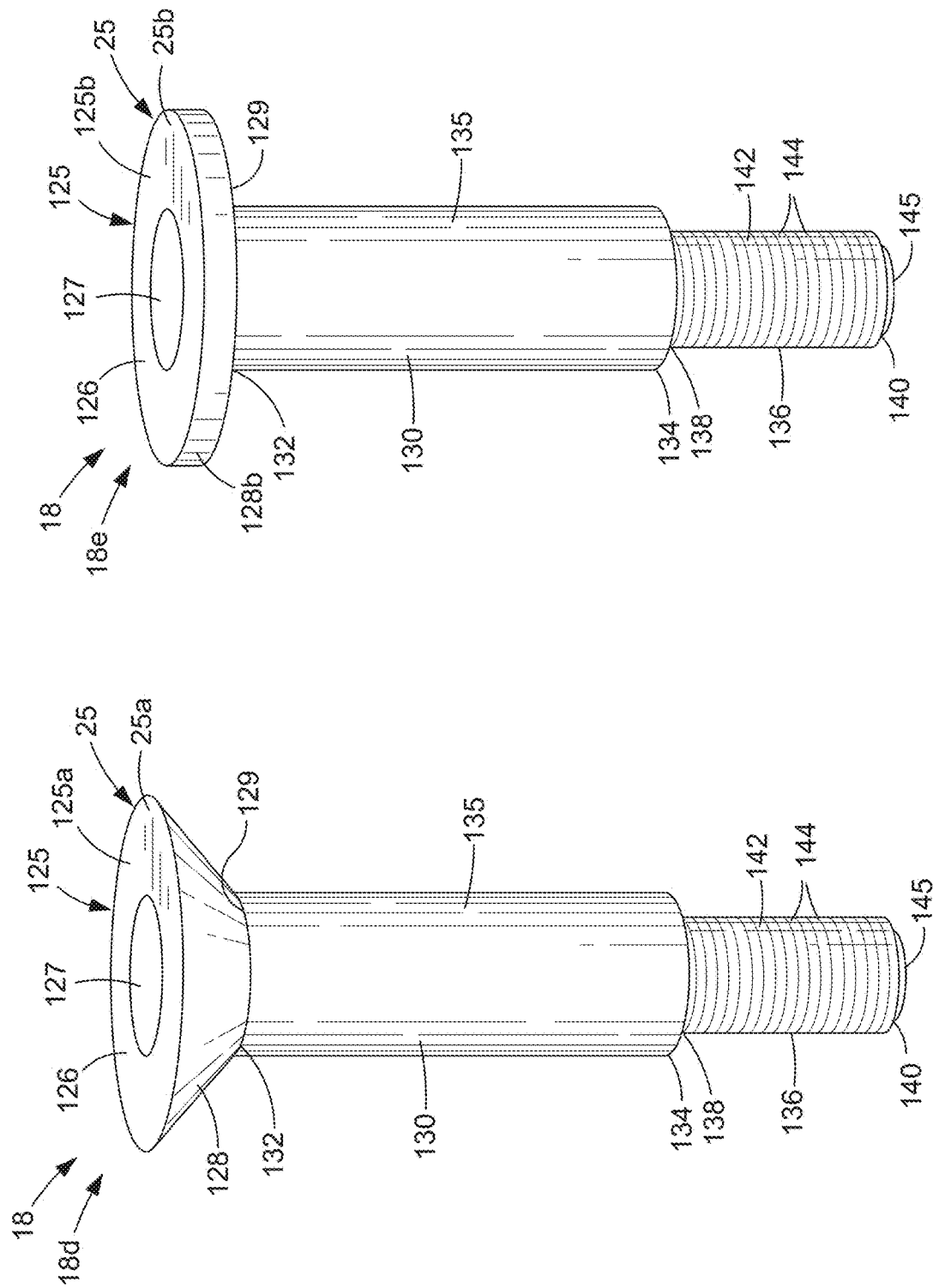

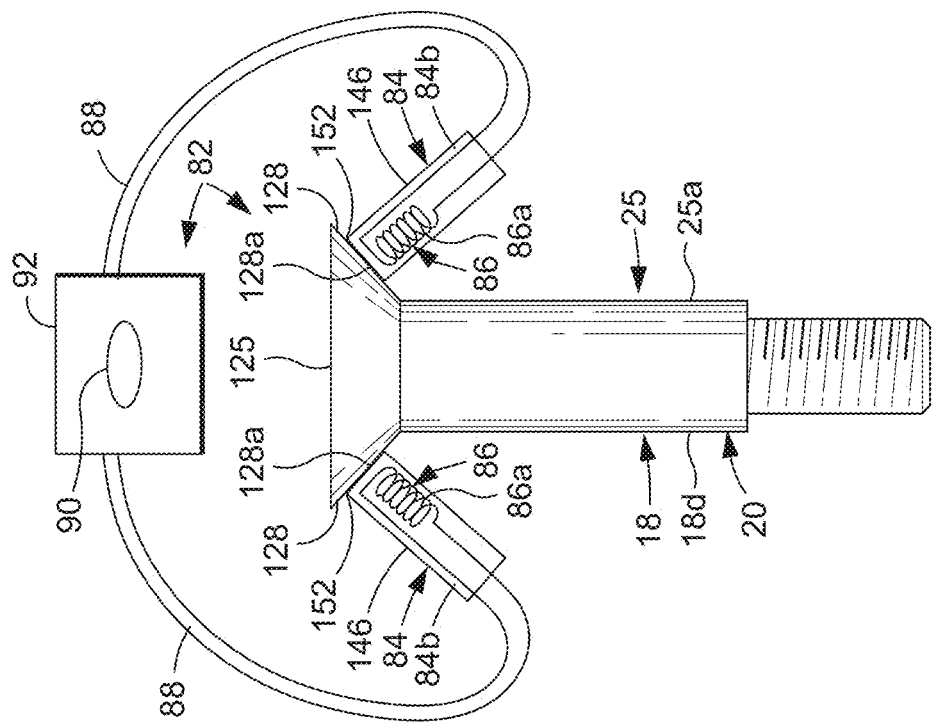
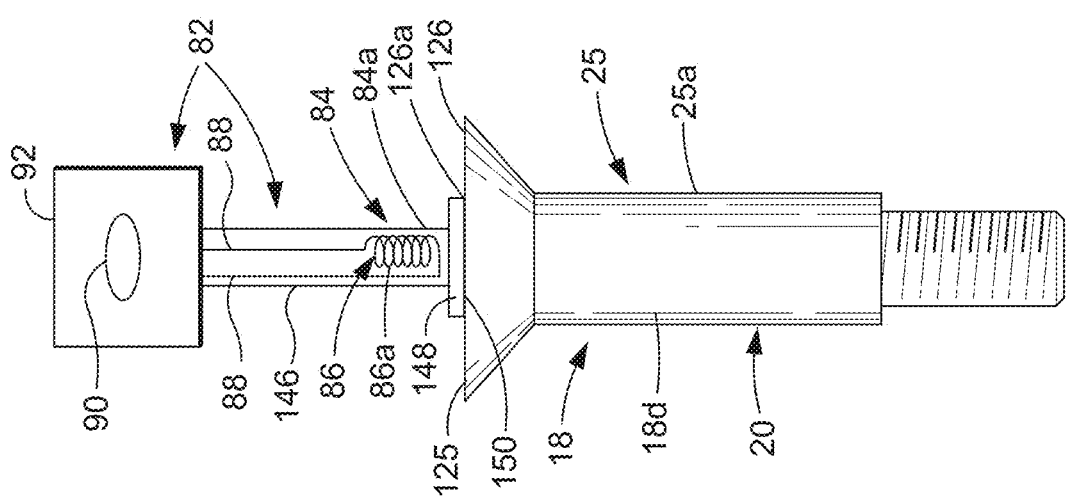
FIG. 3B
FIG. 3A

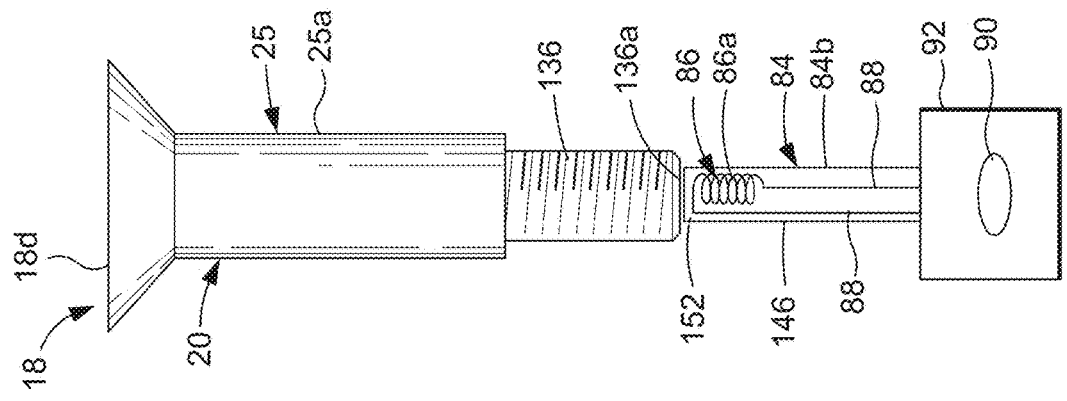
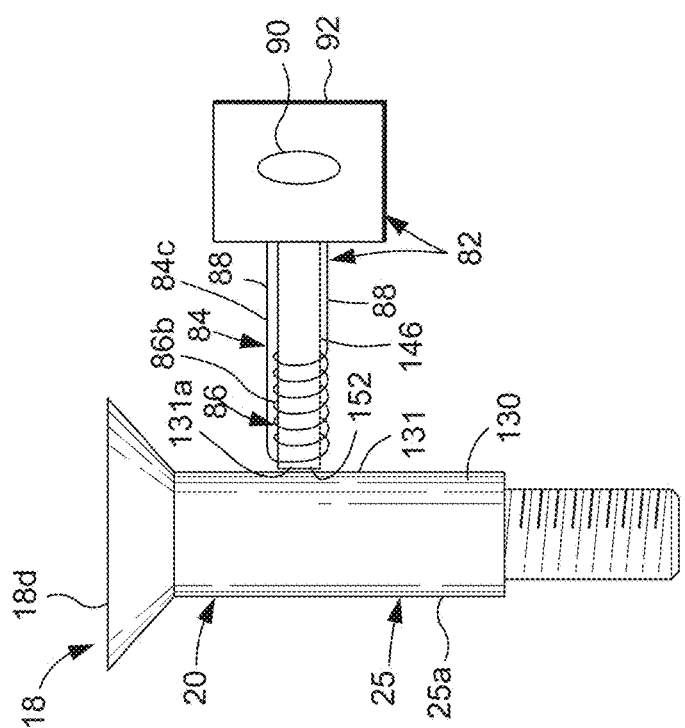
FIG. 3D
FIG. 3C

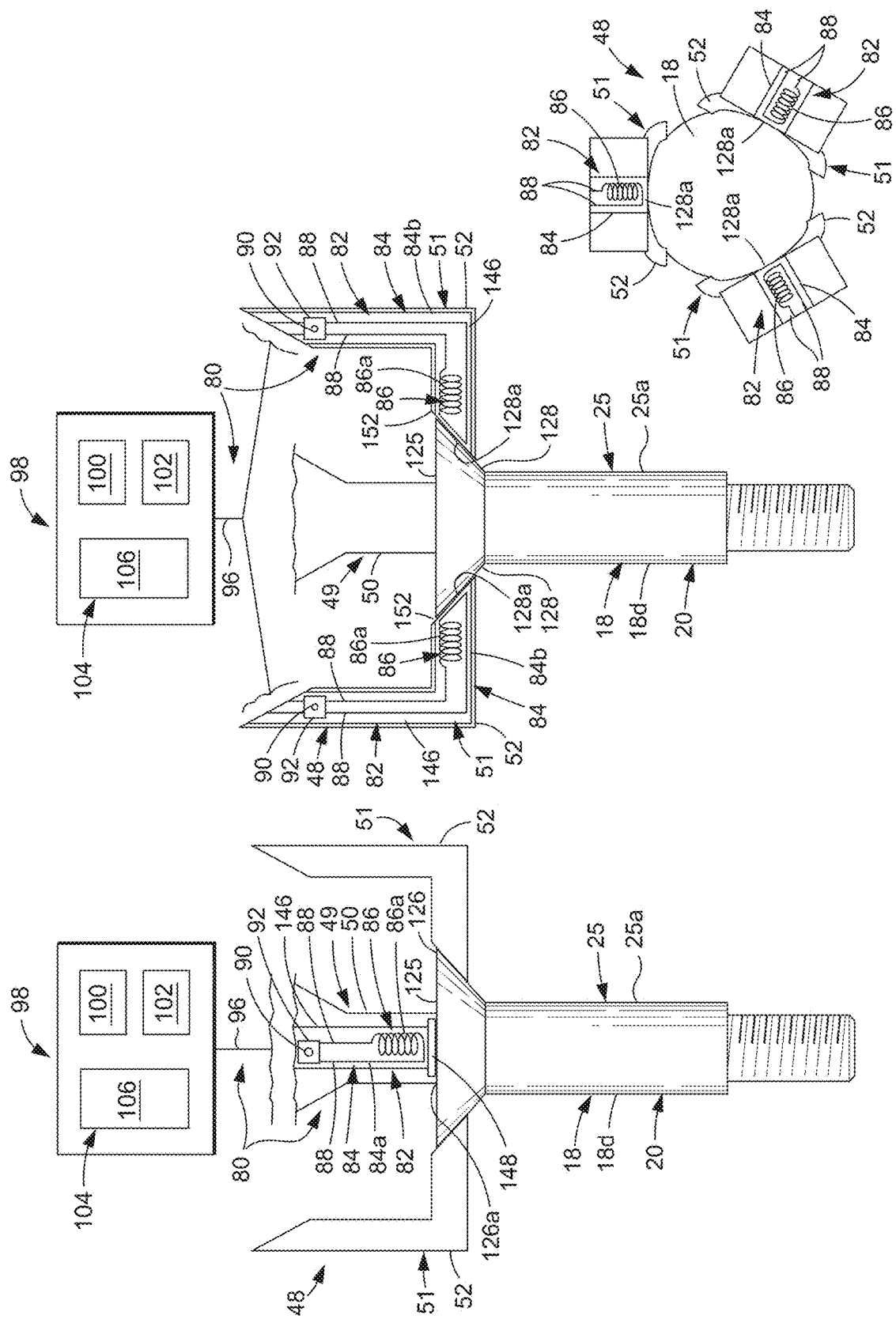

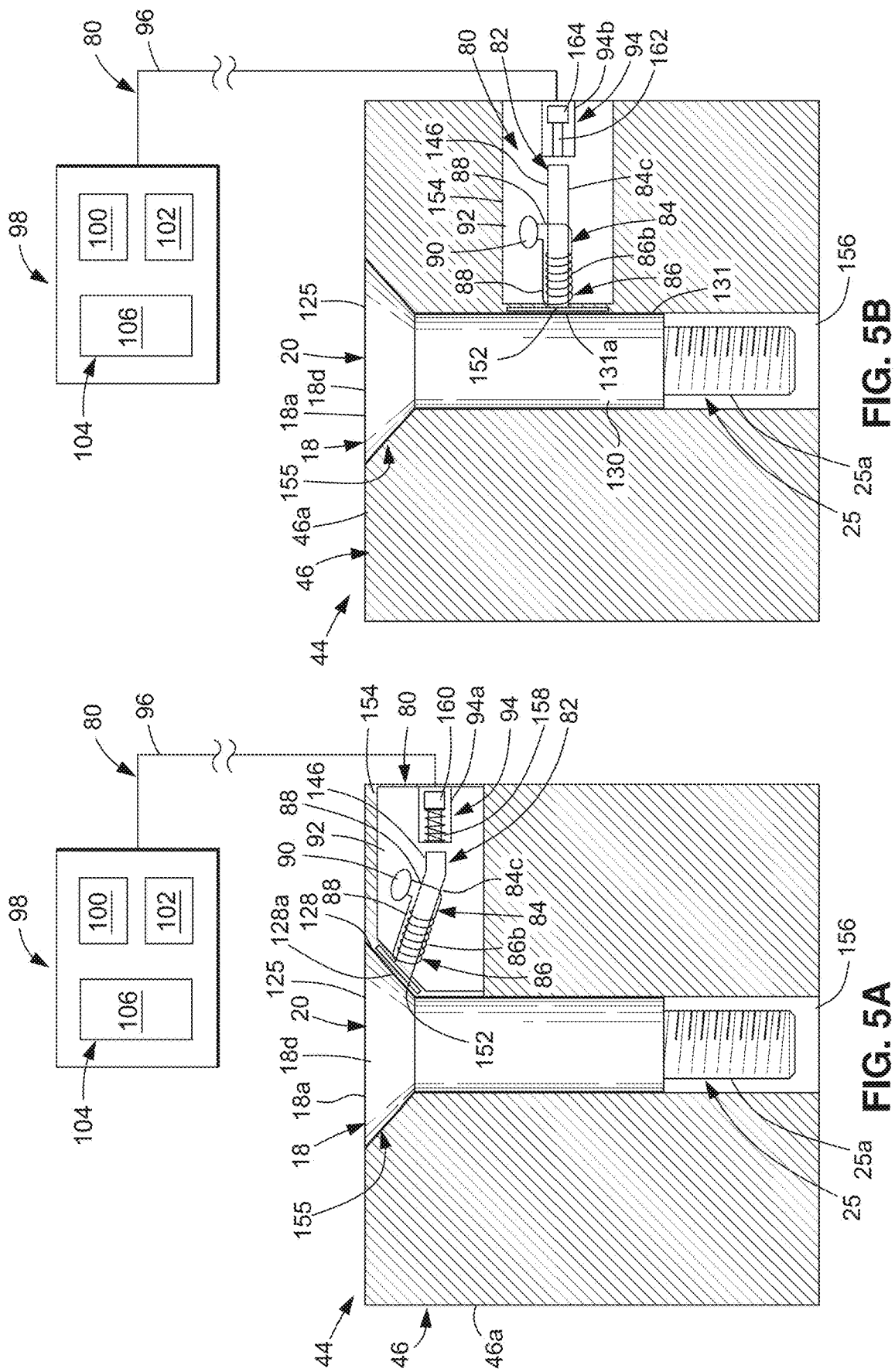

AUTOMATED FASTENER SYSTEM AND METHOD HAVING FASTENER CONDUCTIVITY TESTING

FIELD

The present disclosure relates generally to automated fastener systems and methods, and more particularly, to automated fastener systems and methods having fastener conductivity testing, where the fasteners are installed in a structure, such as an aircraft structure.

BACKGROUND

Fasteners, such as bolts, rivets, screws, pins, and bushings are typically used to join two or more structural members together to assemble a structure. With an increase in automated assembly and manufacturing processes, such fasteners may be automatically installed in structures such as aircraft structures, spacecraft structures, rotorcraft structures, watercraft structures, and other vehicles and structures, to join the structural members together. Certain fasteners may have an identical or similar appearance, size, and/or color but may be made from different materials, resulting in different strength characteristics. Moreover, even if such fasteners are marked to indicate the type of fastener, such markings may be inadvertently removed or made illegible during an installation and assembly process. If an incorrect fastener is automatically installed in a structure, for example, an aircraft structure, where the fastener is not the designed strength, potential adverse issues may result.

Known color vision systems exist that match a color contained within an image to a predefined color, for example, to determine a type of fastener based on color. However, such known color vision systems cannot tell the difference between fastener colors that are the same or similar. Moreover, if a fastener is coated with an incorrect color, such known color vision systems cannot detect what material the fastener is made of. Thus, such known color vision systems may be unreliable.

In addition, known hardness testing methods exist to measure hardness of a fastener material to deformation. The results of such known hardness testing methods on fasteners of an unknown material may be compared to known material hardnesses to determine the material. However, such known hardness testing methods involve the application of external force, such as indentation, scratching, or compression, on the surface of the fastener material. Such application of external force may result in undesirable damage to the fastener.

Accordingly, there is a need in the art for an improved automated fastener system and method having fastener conductivity testing of fasteners that uses conductivity measuring probes integrated at various points in an automated fastener system, that determines a base material of the fastener using conductivity measurement without damage to the fastener, and that provide advantages over known systems and methods.

SUMMARY

Example implementations of the present disclosure provide for an improved automated fastener system and method having fastener conductivity testing. As discussed in the below detailed description, versions of the improved automated fastener system and method may provide significant advantages over known systems and methods.

In a version of the disclosure, there is provided an automated fastener system having fastener conductivity testing. The automated fastener system comprises an automated fastener holder assembly holding and dispensing one or more fasteners. The automated fastener system further comprises an automated fastener shuttle assembly having one or more shuttle cups, wherein a selected shuttle cup receives a selected fastener from the automated fastener holder assembly, and transports the selected fastener in the selected shuttle cup.

The automated fastener system further comprises an automated fastener inspection system having an inspection center shaft, and two or more inspection gripper fingers configured to pick up, to inspect, and to release the selected fastener. The automated fastener system further comprises an automated delivery system having a delivery device configured to transport the selected fastener. The automated fastener system further comprises an automated fastener installation system having an end effector with an end effector center shaft, and two or more end effector gripper fingers configured to pick up the selected fastener from the delivery device transported by the automated delivery system, and configured to install the selected fastener in a structure.

The automated fastener system further comprises an automated eddy current conductivity probe system comprising an eddy current conductivity probe assembly. The eddy current conductivity probe assembly is integrated in one of, the one or more shuttle cups, the inspection center shaft, the two or more inspection gripper fingers, the end effector center shaft, or the two or more end effector gripper fingers. The eddy current conductivity probe assembly contacts the selected fastener to perform the fastener conductivity testing and to obtain an electrical conductivity measurement of the selected fastener.

The automated fastener system further comprises a processing system to process the electrical conductivity measurement of the selected fastener. The processing system comprises a computer system with a computer having a computer console, and a computer software program implementing a control logic. The control logic implemented by the computer software program compares the electrical conductivity measurement of the selected fastener against a predetermined electrical conductivity value range of a predetermined fastener material, to obtain a fastener material determination of the selected fastener, and to accept, or to reject, the selected fastener based on the fastener material determination.

In another version of the disclosure, there is provided an automated fastener system having fastener conductivity testing for an aircraft fastener. The automated fastener system comprises an automated fastener holder assembly having one or more fastener holders holding and dispensing one or more aircraft fasteners. The automated fastener system further comprises an automated fastener shuttle assembly having one or more shuttle cups, wherein a selected shuttle cup receives a selected aircraft fastener from the one or more fastener holders, and transports the selected aircraft fastener in the selected shuttle cup.

The automated fastener system further comprises an automated fastener inspection system having an inspection center shaft, and two or more inspection gripper fingers configured to pick up the selected aircraft fastener from the selected shuttle cup, configured to grip and to inspect the selected aircraft fastener, and configured to release the selected aircraft fastener back into the selected shuttle cup. The automated fastener system further comprises an automated delivery system having a delivery device configured to transport the selected aircraft fastener away from the automated fastener inspection system. The automated fastener system further comprises an automated fastener installation system having an end effector with an end effector center shaft, and two or more end effector gripper fingers configured to pick up the selected aircraft fastener from the delivery device transported by the automated delivery system, and configured to install the selected aircraft fastener in an aircraft structure.

The automated fastener system further comprises an automated eddy current conductivity probe system. The automated eddy current conductivity probe system comprises an eddy current conductivity probe assembly integrated in one of, the one or more shuttle cups, the inspection center shaft, the two or more inspection gripper fingers, the end effector center shaft, or the two or more end effector gripper fingers. The eddy current conductivity probe assembly contacts the selected aircraft fastener to perform the fastener conductivity testing and to obtain an electrical conductivity measurement of the selected aircraft fastener.

The automated fastener system further comprises a processing system to process the electrical conductivity measurement. The processing system comprises a computer system with a computer having a computer console, and a computer software program implementing a control logic. The control logic implemented by the computer software program compares the electrical conductivity measurement of the selected aircraft fastener against a predetermined electrical conductivity value range of a predetermined fastener material, to obtain a fastener material determination of the selected aircraft fastener, and to accept, or to reject, the selected aircraft fastener based on the fastener material determination.

In another version of the disclosure, there is provided an automated method of performing fastener conductivity testing in an automated fastener system. The automated method comprises providing the automated fastener system. The automated fastener system comprises an automated fastener holder assembly holding and dispensing one or more fasteners. The automated fastener system further comprises an automated fastener shuttle assembly having one or more shuttle cups, wherein a selected shuttle cup receives a selected fastener from the automated fastener holder assembly, and transports the selected fastener in the selected shuttle cup.

The automated fastener system further comprises an automated fastener inspection system having an inspection center shaft, and two or more inspection gripper fingers configured to pick up, to inspect, and to release the selected fastener. The automated fastener system further comprises an automated delivery system having a delivery device configured to transport the selected fastener. The automated fastener system further comprises an automated fastener installation system having an end effector with an end effector center shaft, and two or more end effector gripper fingers configured to pick up the selected fastener from the delivery device transported by the automated delivery system, and configured to install the selected fastener in a structure.

The automated fastener system further comprises an automated eddy current conductivity probe system comprising an eddy current conductivity probe assembly integrated in one of, the one or more shuttle cups, the inspection center shaft, the two or more inspection gripper fingers, the end effector center shaft, or the two or more end effector gripper fingers. The automated fastener system further comprises a processing system comprising a computer system with a computer having a computer console, and a computer software program implementing a control logic.

The automated method further comprises performing the fastener conductivity testing on the selected fastener, by contacting the selected fastener with the eddy current conductivity probe assembly integrated in one of, the one or more shuttle cups, the inspection center shaft, the two or more inspection gripper fingers, the end effector center shaft, or the two or more end effector gripper fingers, to obtain an electrical conductivity measurement of the selected fastener. The automated method further comprises using the control logic of the processing system to compare the electrical conductivity measurement of the selected fastener against a predetermined electrical conductivity value range of a predetermined fastener material, to obtain a fastener material determination of the selected fastener. The automated method further comprises accepting or rejecting the selected fastener based on the fastener material determination.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2A is an illustration of a perspective view of an exemplary fastener that may used in versions of the automated fastener system of the disclosure;

FIG. 2B is an illustration of a perspective view of another exemplary fastener that may used in versions of the automated fastener system of the disclosure;

FIG. 3A is an illustration of a front view of a fastener with a version of an eddy current conductivity probe assembly contacting a top end portion of a fastener head;

FIG. 3B is an illustration of a front view of the fastener of FIG. 3A with a version of eddy current conductivity probe assemblies contacting side portions of the fastener head;

FIG. 3C is an illustration of a front view of the fastener of FIG. 3A with a version of an eddy current conductivity probe assembly contacting a shank side portion of a fastener shank;

FIG. 3D is an illustration of a front view of the fastener of FIG. 3A with a version of an eddy current conductivity probe assembly contacting a tail end portion of the fastener shank;

FIG. 4A is an illustration of a front view of a fastener held by gripper fingers, and showing a center shaft with an eddy current conductivity probe assembly contacting a top end portion of a fastener head of the fastener;

FIG. 4B is an illustration of a front view of the fastener of FIG. 4A held by gripper fingers with eddy current conductivity probe assemblies contacting side portions of the fastener head of the fastener;

FIG. 4C is an illustration of a top sectional view of the fastener of FIG. 4B held by the gripper fingers with eddy current conductivity probe assemblies contacting side portions of the fastener head of the fastener;

FIG. 5A is an illustration of a partial sectional front view of a version of a fastener countersunk in a shuttle cup with an eddy current conductivity probe assembly contacting a side portion of a fastener head of the fastener;

FIG. 5B is an illustration of a partial sectional front view of another version of a fastener countersunk in a shuttle cup with an eddy current conductivity probe assembly contacting a shank side portion of a fastener shank of the fastener;

Figure 1:
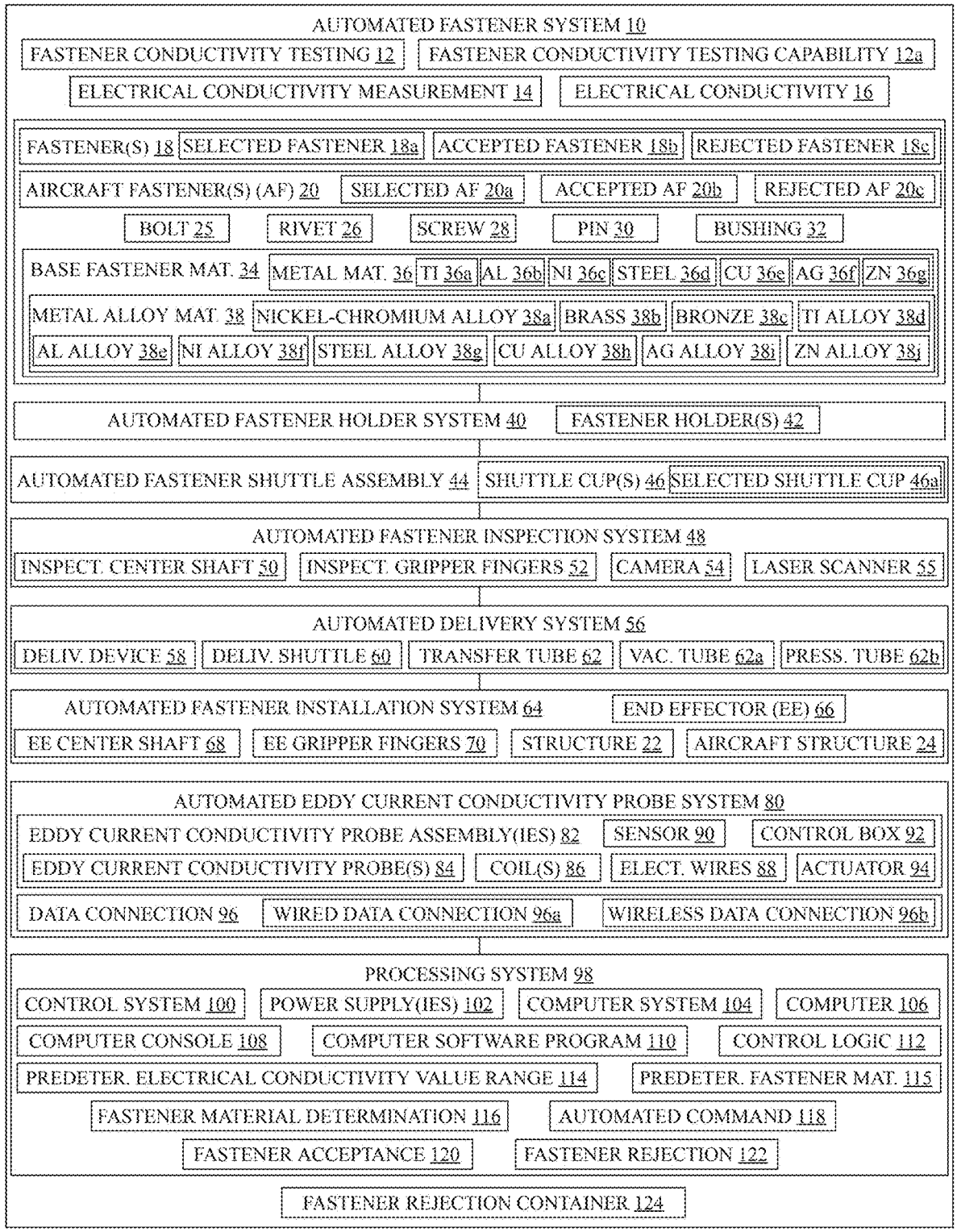
FIG. 1 is an illustration of a block diagram of an exemplary automated fastener system of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 15:
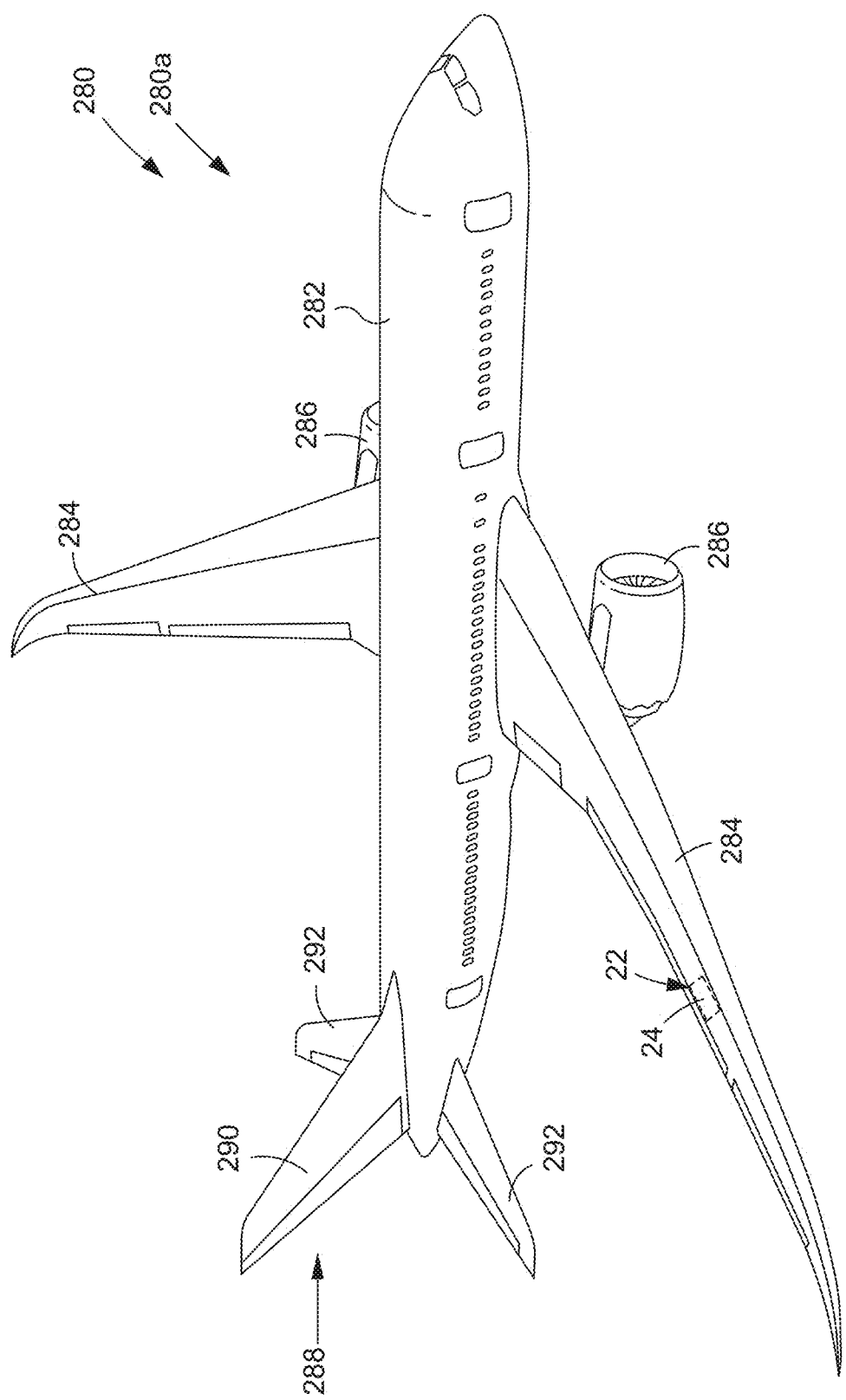
FIG. 15 is an illustration of a perspective view of an aircraft that incorporates aircraft structures having fasteners of a type that can undergo fastener conductivity testing with versions of an automated fastener system and an automated method of the disclosure.

Now referring to FIG. 1, FIG. 1 is an illustration of a block diagram of an exemplary automated fastener system 10 having fastener conductivity testing 12, such as fastener conductivity testing capability 12a, to obtain an electrical conductivity measurement 14 of electrical conductivity 16 of a fastener 18, prior to installation of the fastener 18, such as an aircraft fastener 20, in a structure 22 (see also FIG. 15), such as an aircraft structure 24 (see also FIG. 15). The fastener 18 may also comprise another suitable fastener for installation in another suitable structure, for example, a spacecraft structure, a rotorcraft structure, an unmanned aircraft structure, a watercraft structure, an automobile structure, a truck structure, a train structure, an architectural structure, or other suitable structures.

The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the automated fastener system 10 in FIG. 1 are not meant to imply physical or architectural limitations to the manner in which an illustrative example may be implemented. Other components in addition to, or in place of, the ones illustrated may be used. Some components may be unnecessary.

The automated fastener system 10 comprises one or more fasteners 18, such as one or more aircraft fasteners 20, used to join multiple pieces of the structure 22, such as the aircraft structure 24, together. As shown in FIG. 1, one of the one or more fasteners 18 selected for use in the automated fastener system 10, including fastener conductivity testing 12, comprises a selected fastener 18a. After the selected fastener 18a undergoes the fastener conductivity testing 12, the selected fastener 18a comprises either an accepted fastener 18b (see FIG. 1) or a rejected fastener 18c (see FIG. 1), as discussed in further detail below.

As further shown in FIG. 1, one of the one or more aircraft fasteners (AF) 20 selected for use in the automated fastener system 10, including the fastener conductivity testing 12, comprises a selected aircraft fastener (AF) 20a. After the selected aircraft fastener 20a undergoes the fastener conductivity testing 12, the selected aircraft fastener 20a comprises either an accepted aircraft fastener (AF) 20b (see FIG. 1), or a rejected aircraft fastener (AF) 20c (see FIG. 1).

As shown in FIG. 1, each of the one or more fasteners 18, such as the one or more aircraft fasteners 20, comprises one of, a bolt 25, a rivet 26, a screw 28, a pin 30, a bushing 32, or another suitable fastener.

As further shown in FIG. 1, each of the one or more fasteners 18, such as the one or more aircraft fasteners 20, is made of a base fastener material (MAT.) 34. As shown in FIG. 1, the base fastener material 34 may comprise a metal material (MAT.) 36, including titanium (TI) 36a, aluminum (AL) 36b, nickel (NI) 36c, steel 36d, copper (CU) 36e, silver (AG) 36f, zinc (ZN) 36g, or another suitable metal material. The base fastener material 34 may further comprise a metal alloy material (MAT.) 38, including a nickel-chromium alloy 38a, brass 38b, bronze 38c, a titanium (TI) alloy 38d, an aluminum (AL) alloy 38e, a nickel (NI) alloy 38f, a steel alloy 38g, a copper (CU) alloy 38h, a silver (AG) alloy 38i, a zinc (ZN) alloy 38j, or another suitable metal alloy. In other versions of the fastener 18, the base fastener material 34 may comprise another suitable material.

In one version, each of the one or more fasteners 18, such as the one or more aircraft fasteners 20, is coated with a coating, such as a dry film lubricant coating, an applied coating, or another suitable coating. Preferably, the coating is a nonconductive coating that is unable to conduct electricity. In another version, each of the one or more fasteners 18, such as the one or more aircraft fasteners 20, is uncoated or one or more has uncoated portions.

As shown in FIG. 1, the automated fastener system 10 comprises an automated fastener holder assembly 40 configured to hold and to dispense, and holding and dispensing, the one or more fasteners 18, such as the one or more aircraft fasteners 20. The automated fastener holder assembly 40 comprises one or more fastener holders 42 (see FIGS. 1, 6-8), such as in the form of one or more vertical tubes, cassettes, chutes, hangers, or other suitable fastener holder structures. The fastener holders 42 may accommodate fasteners 18 of different size diameters, for example, one fastener holder 42 may hold fasteners 18 of one diameter size, and another fastener holder 42 may hold fasteners 18 of another diameter size. The fastener holders 42 may receive the fasteners 18, such as the aircraft fasteners 20, from a fastener feeder device (not shown), such as a bowl feeder or other suitable fastener feeder device, located upstream of the automated fastener holder assembly 40 of the automated fastener system 10.

As further shown in FIG. 1, the automated fastener system 10 comprises an automated fastener shuttle assembly 44 having one or more shuttle cups 46. A selected shuttle cup 46a of the one or more shuttle cups 46 receives a selected fastener 18a of the one or more fasteners 18 from the automated fastener holder assembly 40, and the selected shuttle cup 46 transports the selected fastener 18a in the selected shuttle cup 46a. The selected shuttle cup 46a is configured to receive, and receives, the selected fastener 18a from the fastener holder 42 of the automated fastener holder assembly 40, for example, the selected fastener 18a may drop out of the fastener holder 42 into the selected shuttle cup 46a positioned below the fastener holder 42. The selected fastener 18a is selected based on its kind or type, its diameter, and its length. The selected shuttle cup 46a supports and holds the selected fastener 18a in the selected shuttle cup 46a and in one version, the selected shuttle cup 46a does not have retention features, such as clamps or other types of retention features, to retain the selected fastener 18a in the selected shuttle cup 46a. The shuttle cup 46 is discussed in further detail below with regard to FIGS. 5A-5B and 10A-10B.

As further shown in FIG. 1, the automated fastener system 10 comprises an automated fastener inspection system 48. The selected shuttle cup 46 transports the selected fastener 18a from the automated fastener holder assembly 40 to the automated fastener inspection system 48, via an automatic transport mechanism (not shown) of the automated fastener shuttle assembly 44, for example, the automatic transport mechanism may comprise a rail or a track system along which the selected shuttle cup 46 automatically moves back and forth between the automated fastener holder assembly 40 to the automated fastener inspection system 48. The automatic transport mechanism may also comprise another suitable transport system to automatically move the shuttle cups 46 between the automated fastener holder assembly 40 and the automated fastener inspection system 48.

Figure 9:
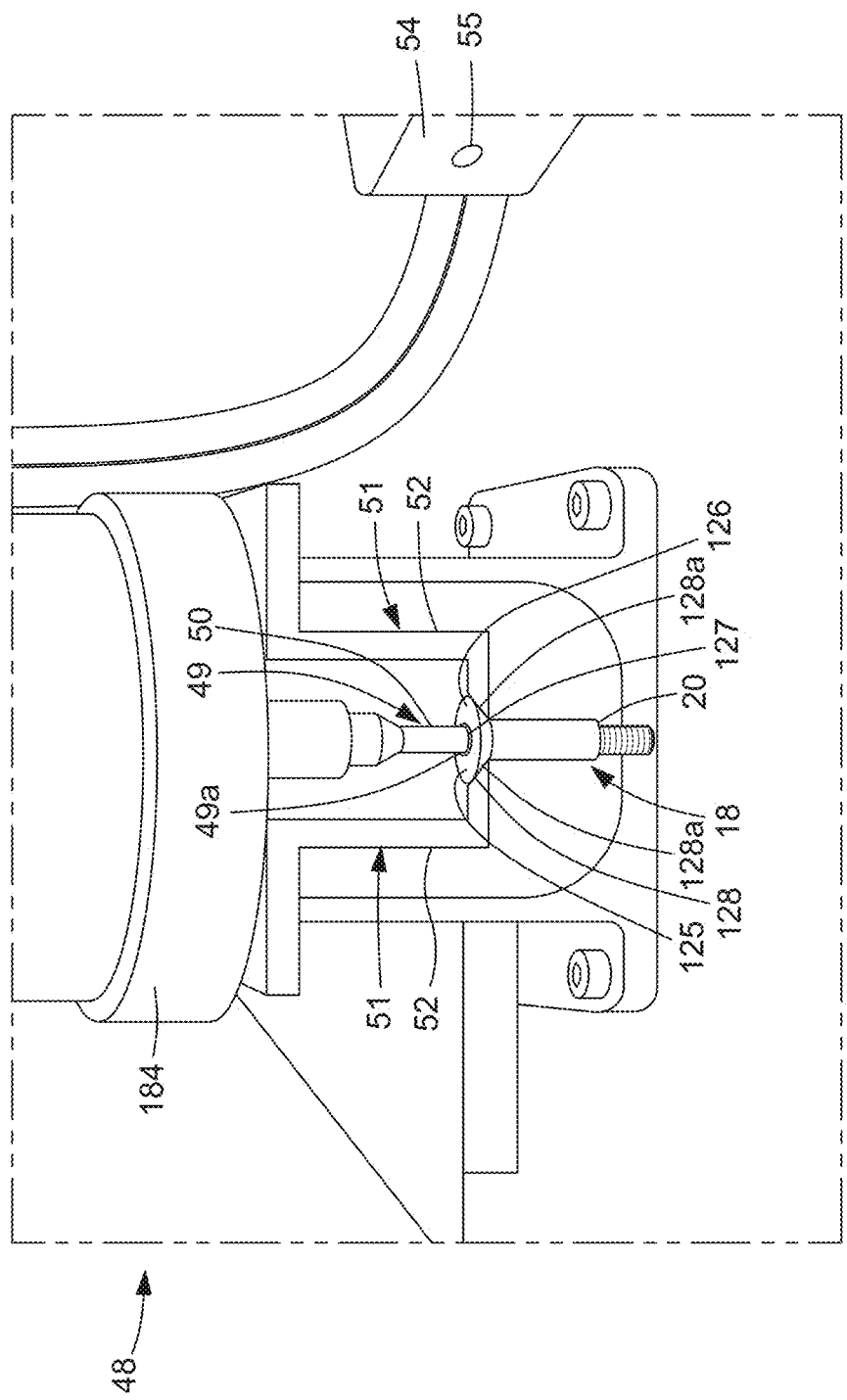
FIG. 9 is an illustration of a front perspective view of an exemplary automated fastener inspection system used in a version of an automated fastener system and an automated method of the disclosure, showing inspection gripper fingers holding a fastener.

As shown in FIG. 1, the automated fastener inspection system 48 has an inspection (INSPECT.) center shaft 50 (see also FIG. 9), and two or more inspection (INSPECT.) gripper fingers 52 (see also FIG. 9). The inspection gripper fingers 52, such as in the form of a claw, are configured to automatically pick up the selected fastener 18a, to automatically grip and to automatically inspect the selected fastener 18a, and to automatically release the selected fastener 18a. In one version, as shown in FIG. 1, the automated fastener inspection system 48 comprises a camera 54 and a laser scanner 55 to inspect the selected fastener 18a. The automated fastener inspection system 48 may also comprise further suitable components for inspection of the selected fastener 18a.

As further shown in FIG. 1, the automated fastener system 10 comprises an automated delivery system 56 having a delivery (DELIV.) device 58 configured to transport and deliver, and transporting and delivering, the selected fastener 18a away from the automated fastener inspection system 48. In one version, the delivery device 58 comprises a delivery (DELIV.) shuttle 60 (see FIGS. 1, 6-8, 11), such as a receptacle or a cup, or another suitable delivery container device. The delivery shuttle 60 is designed to encapsulate the selected fastener 18a within the delivery shuttle 60. As shown in FIG. 1, the automated delivery system 56 further comprises a transfer tube 62, such as a vacuum (VAC.) tube 62a, a pressure (PRESS.) tube 62b, or another suitable transfer tube, to transfer or transport the delivery device 58, such as the delivery shuttle 60, carrying the selected fastener 18a after the selected fastener 18a has been inspected and passed inspection by the automated fastener inspection system 48. The delivery device 58, such as the delivery shuttle 60, is discussed in further detail below with respect to FIG. 11.

As further shown in FIG. 1, the automated fastener system 10 comprises an automated fastener installation system 64. The selected fastener 18a is transported by the automated delivery system 56 from the automated fastener inspection system 48 to the automated fastener installation system 64. As shown in FIG. 1, the automated fastener installation system 64 has an end effector (EE) 66 coupled to an end effector (EE) center shaft 68 (see also FIG. 12A), and coupled to two or more end effector (EE) gripper fingers 70 (see also FIG. 12B). The end effector gripper fingers 70 are configured to pick up the selected fastener 18a from the delivery device 58, such as the delivery shuttle 60, transported by the automated delivery system 56, and the automated fastener installation system 64 is configured to install, and installs, the selected fastener 18a into the structure 22 (see FIGS. 1, 15), such as the aircraft structure 24 (see FIGS. 1, 15), or another suitable structure.

Figure 12A:
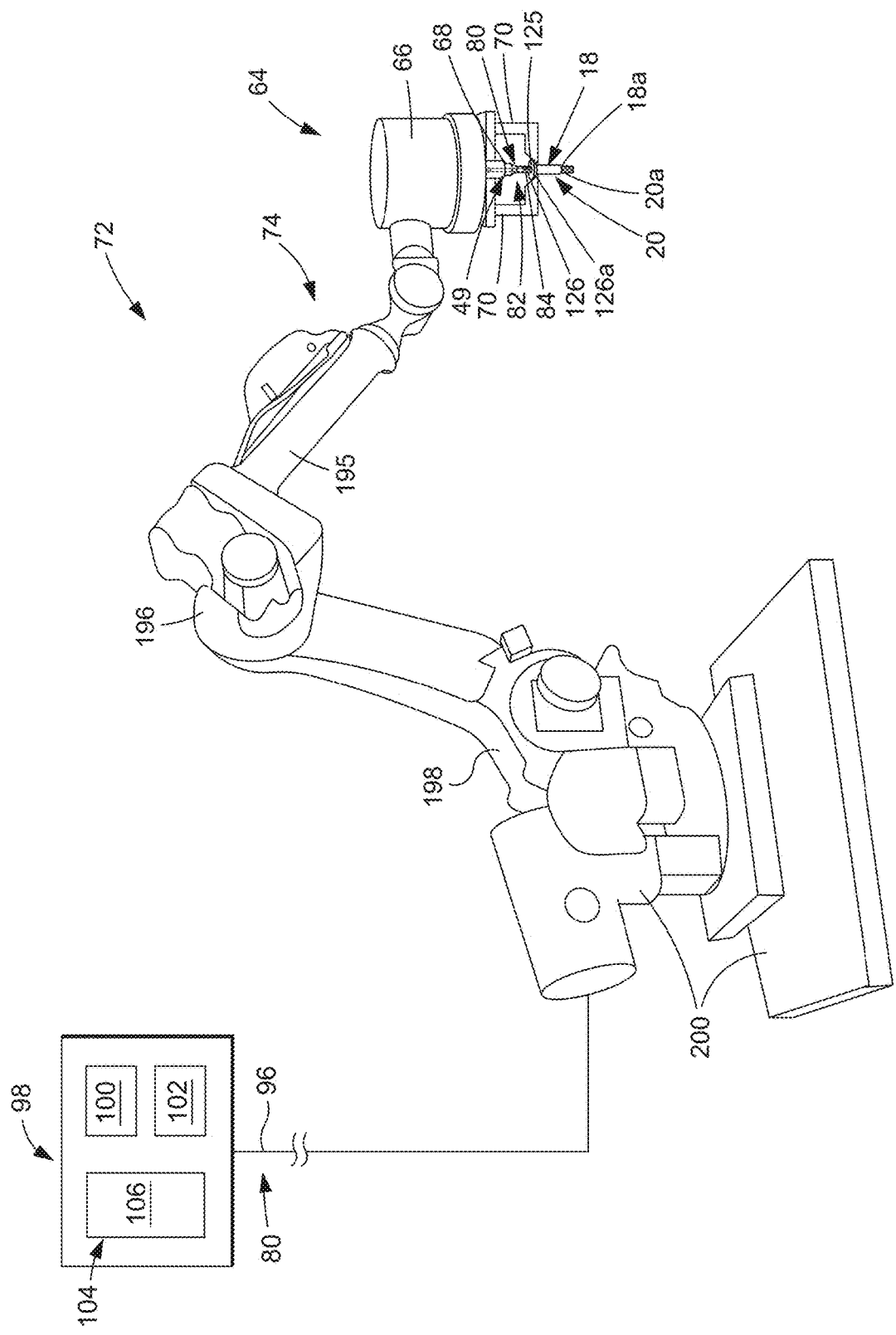
FIG. 12A is an illustration of a side perspective view of a version of an automated fastener installation system used in a version of an automated fastener system and an automated method of the disclosure, showing a robotic system having an end effector coupled to an end effector center shaft with an eddy current conductivity probe assembly contacting a fastener.

In one version, as show in FIG. 12A, the automated fastener installation system 64 further comprises the end effector 66 coupled to a robotic system 72 with a robot 74. The robotic system 72 is discussed in further detail below with regard to FIG. 12A. In another version, as show in FIG. 12B, the automated fastener installation system 64 further comprises the end effector 66 coupled to a gantry system 76 with a gantry 78. The gantry system 76 is discussed in further detail below with regard to FIG. 12B.

As further shown in FIG. 1, the automated fastener system 10 comprises an automated eddy current conductivity probe system 80 comprising one or more eddy current conductivity probe assemblies 82. As shown in FIG. 1, the eddy current conductivity probe assembly 82 comprises one or more eddy current conductivity probes 84 with one or more coils 86 coupled to electrical (ELECT.) wires 88. As further shown in FIG. 1, the eddy current conductivity probe assembly 82 comprises a sensor 90 preferably housed in a control box 92. The sensor 90 is coupled to the one or more eddy current conductivity probes 84, via the electrical wires 88.

The eddy current conductivity probe 84 is a contact probe that may comprise one of, an eddy current conductivity surface probe 84a (see FIG. 3A), an eddy current conductivity pencil probe 84b (see FIG. 3B), an eddy current conductivity encircling probe 84c (see FIG. 3C), or another suitable type of eddy current conductivity probe 84. The eddy current conductivity surface probe 84a, a contact probe, may be used to scan a large area and allow for deeper penetration to get a larger electrical conductivity measurement 14 (see FIG. 1) of the base fastener material 34. The coil configuration of the eddy current conductivity surface probe 84a may comprise a pancake coil. The eddy current conductivity pencil probe 84b, a contact probe, may include a small surface coil encased in a long slender housing to permit measuring or scanning of small areas. The eddy current conductivity encircling probe 84c, which is a contact probe, may be suitable for measuring enclosed or interior areas such as tubes or other suitable interior areas of objects or structures.

In general, the eddy current conductivity probe 84 comprises a coil 86 of conductive wire and an alternating current flows through the coil 86 and generates an oscillating magnetic field. If the eddy current conductivity probe 84 and its magnetic field are brought close to a conductive material, such as a metal material 36 (see FIG. 1) of the fastener 18 (see FIG. 1), a circular flow of electrons known as an eddy current begins to move through the metal material 36, and the eddy current flowing through the metal material 36, in turn, generates its own magnetic field, which interacts with the coil 86 and its field through mutual inductance. The eddy current conductivity probes 84 are used to measure the electrical conductivity 16 (see FIG. 1) of the fastener 18, such as the aircraft fastener 20.

In one version, as shown in FIGS. 5A-5B, the eddy current conductivity probe assembly 82 also comprises an actuator 94 (see also FIG. 1) coupled to the one or more eddy current conductivity probes 84, to move the one or more eddy current conductivity probes 84 against the selected fastener 18a. The actuator 94 is discussed in further detail below with regard to FIGS. 5A-5B.

The eddy current conductivity probe assembly 82 is integrated in one of, the one or more shuttle cups 46, the inspection center shaft 50, the two or more inspection gripper fingers 52, the end effector center shaft 68, or the two or more end effector gripper fingers 70. Each eddy current conductivity probe assembly 82 contacts the selected fastener 18a to perform the fastener conductivity testing 12 and to obtain an electrical conductivity measurement 14 of the selected fastener 18a. The automated eddy current conductivity probe system 80 with one or more eddy current conductivity probe assemblies 82 is discussed in further detail below with regard to FIGS. 3A-5B.

As shown in FIG. 1, the automated eddy current conductivity probe system 80 further comprises a data connection 96 to transmit the electrical conductivity measurement 14 taken with the eddy current conductivity probe assembly 82. The data connection 96 may comprise a wired data connection 96a (see FIG. 1), or a wireless data connection 96b (see FIG. 1).

As further shown in FIG. 1, the automated fastener system 10 comprises a processing system 98 to process the electrical conductivity measurement 14 of the selected fastener 18a. As shown in FIG. 1, the processing system 98 comprises a control system 100, one or more power supplies 102, a computer system 104 with a computer 106 having a computer console 108, and a computer software program 110 implementing a control logic 112. As shown in FIG. 1, the control logic 112 implemented by the computer software program 110 uses the electrical conductivity measurement 14 of the selected fastener 18*a*, such as the selected aircraft fastener 20*a*, to compare against a predetermined (PREDETER.) electrical conductivity value range 114 of a predetermined (PREDETER.) fastener material (MAT.) 115, to obtain a fastener material (MAT.) determination 116 of the selected fastener 18*a*, such as the selected aircraft fastener 20*a*. The control logic 112 compares the electrical conductivity measurement 14 to the predetermined electrical conductivity value range 114 of the predetermined fastener material 115 to obtain the fastener material determination 116, which is based on the difference in value between the electrical conductivity measurement 14 that is actually measured and the predetermined electrical conductivity value range 114. As used here, "predetermined electrical conductivity value range" means a standard or known electrical conductivity value range of a known fastener material measured by an eddy current conductivity probe.

Based on the fastener material determination 116 of a pass meaning a correct fastener material, or a fail meaning an incorrect fastener material, an automated command 118 (see FIG. 1) is sent, and if it is a pass, the selected fastener 18*a*, such as the selected aircraft fastener 20*a*, is accepted to obtain a fastener acceptance 120 (see FIG. 1) of an accepted fastener 18*b* (see FIG. 1), such as an accepted aircraft fastener 20*b* (see FIG. 1), or if it is a fail, the selected fastener 18*a*, such as the selected aircraft fastener 20*a*, is rejected to obtain a fastener rejection 122 (see FIG. 1) of a rejected fastener 18*c* (see FIG. 1), such as a rejected aircraft fastener 20*b* (see FIG. 1).

As further shown in FIG. 1, the automated fastener system 10 preferably comprises a fastener rejection container 124 (see also FIGS. 6-8), such as in the form of a bin, a can, a box, a basket, or another suitable type of container. The fastener rejection container 124 is configured to receive, and receives, any rejected fasteners 18*c*, such as rejected aircraft fasteners 20*c*. The fastener rejection container 124 is used to discard the selected fastener 18*a*, such as the selected aircraft fastener 20*a*, that is determined to be a rejected fastener 18*c* after the fastener material determination 116 and the automated command 118 of fastener rejection 122.

In another version of the disclosure, there is provided an automated fastener system 10 having fastener conductivity testing 12 for an aircraft fastener 20 (see FIG. 1) used in installation in an aircraft structure 24 (see FIGS. 1, 15). The automated fastener system 10 comprises the automated fastener holder assembly 40 (see FIGS. 1, 6-8) having the one or more fastener holders 42 (see FIGS. 1, 6-8) configured to hold and dispense, and holding and dispensing, the one or more aircraft fasteners 20. The automated fastener system 10 further comprises the automated fastener shuttle assembly 44 (see FIG. 1) having one or more shuttle cups 46 (see FIGS. 1, 5A-5B, 10A-10B), wherein a selected shuttle cup 46*a* (see FIG. 1) receives a selected aircraft fastener 20*a* (see FIG. 1) from the one or more fastener holders 42, and transports the selected aircraft fastener 20*a* in the selected shuttle cup 46*a*.

The automated fastener system 10 further comprises the automated fastener inspection system 48 having the inspection center shaft 50, and the two or more inspection gripper fingers 52 (see FIGS. 1, 6) configured to pick up the selected aircraft fastener 20*a* from the selected shuttle cup 46*a*, configured to grip and to inspect the selected aircraft fastener 20*a*, and configured to release the selected aircraft fastener 20*a* back into the selected shuttle cup 46*a* if it passes inspection. The automated fastener system 10 further comprises the automated delivery system 56 (see FIGS. 1, 6) having the delivery device 58 (see FIGS. 1, 6), such as the delivery shuttle 60 (see FIGS. 1, 6), configured to transport and deliver, and transporting and delivering, the selected shuttle cup 46*a* with the selected aircraft fastener 20*a* retained within the selected shuttle cup 46*a*, away from the automated fastener inspection system 48. The automated fastener system 10 further comprises the automated fastener installation system 64 (see FIG. 1) having the end effector 66 (see FIGS. 1, 12A-12B) coupled to the end effector center shaft (see FIGS. 1, 12A-12B), and coupled to the two or more end effector gripper fingers 70 (see FIGS. 1, 12A-12B) configured to pick up the selected aircraft fastener 20*a* from the delivery device 58 transported by the automated delivery system 56, and configured to install the selected aircraft fastener 20*a* into the aircraft structure 24 (see FIGS. 1, 15).

The automated fastener system 10 further comprises the automated eddy current conductivity probe system 80 (see FIG. 1). The automated eddy current conductivity probe system 80 comprises one or more eddy current conductivity probe assemblies 82 (see FIGS. 1, 3A-5B) integrated in one of, the one or more shuttle cups 46, the inspection center shaft 50, the two or more inspection gripper fingers 52, the end effector center shaft 68, or the two or more end effector gripper fingers 70. The eddy current conductivity probe assembly 82 contacts the selected aircraft fastener 20*a* to perform the fastener conductivity testing 12 and to obtain the electrical conductivity measurement 14 of the selected aircraft fastener 20*a*.

The automated fastener system 10 further comprises the processing system 98 (see FIG. 1) to process the electrical conductivity measurement 14. As shown in FIG. 1, the processing system 98 comprises the computer system 104 with the computer 106 having the computer console 108, and comprises the computer software program 110 implementing the control logic 112.

The control logic 112 implemented by the computer software program 110 compares the electrical conductivity measurement 14 of the selected aircraft fastener 20*a* against the predetermined electrical conductivity value range 114 (see FIG. 1) of the predetermined fastener material 115 (see FIG. 1), to obtain the fastener material determination 116 (see FIG. 1) of the selected aircraft fastener 20*a*, and to accept, or to reject, the selected aircraft fastener 20*a* based on the fastener material determination 116, which is based on the difference in value between the electrical conductivity measurement 14 that is actually measured and the predetermined electrical conductivity value range 114.

In one version of the automated fastener system 10 having the fastener conductivity testing 12 for the aircraft fastener 20, the automated eddy current conductivity probe system 80 comprises the eddy current conductivity probe assembly 82 comprising one or more eddy current conductivity probes 84 (see FIGS. 1, 3A-5B), each with one or more coils 86 (see FIGS. 1, 3A-5B) coupled to electrical wires 88 (see FIGS. 1, 3B), and the sensor 90 (see FIGS. 1, 3A-4B, 5A-5B) in the control box 92 (see FIGS. 1, 3A-4B, 5A-5B). The sensor 90 is preferably coupled to the one or more eddy current conductivity probes 84, via the electrical wires 88. The automated eddy current conductivity probe system 80 further comprises the data connection 96 (see FIG. 1) to transmit the electrical conductivity measurement 14 to the computer 106. The data connection 96 comprises one of, the wired data connection 96*a* (see FIG. 1), or the wireless data connection 96*b* (see FIG. 1).

In one version of the automated fastener system 10 having the fastener conductivity testing 12 for the aircraft fastener 20, the eddy current conductivity probe assembly 82 integrated in the one or more shuttle cups 46 (see FIGS. 5A-5B, 7), comprises one or more eddy current conductivity probes 84, each with one or more coils 86 coupled to electrical wires 88. The one or more eddy current conductivity probes 84 are configured to contact, and contact, one of, one or more side portions 128a (see FIG. 5A) of a side 128 of a fastener head 125 (see FIG. 5A) of the selected aircraft fastener 20a in the selected shuttle cup 46a (see FIG. 5A) of the one or more shuttle cups 46, or one or more shank side portions 131a (see FIG. 5B) of a fastener shank 130 (see FIG. 5B) of the selected aircraft fastener 20a in the selected shuttle cup 46. In this version, the eddy current conductivity probe assembly 82 further comprises the actuator 94 (see FIGS. 5A-5B) coupled to the one or more eddy current conductivity probes 84, to move the one or more eddy current conductivity probes 84 against the selected aircraft fastener 20a. The eddy current conductivity probe assembly 82 further comprises the sensor 90 (see FIGS. 5A-5B) in the control box 92 (see FIGS. 5A-5B). The sensor 90 is coupled to the one or more eddy current conductivity probes 84, via the electrical wires 88.

In another version of the automated fastener system 10 having the fastener conductivity testing 12 for the aircraft fastener 20, the eddy current conductivity probe assembly 82 integrated in either, the two or more inspection gripper fingers 52 (see FIG. 6), or the two or more end effector gripper fingers 70 (see FIGS. 8, 12B), comprises the eddy current conductivity probe 84, in each inspection gripper finger 52, or in each end effector gripper finger 70, and each eddy current conductivity probe 84 having one or more coils 86 coupled to electrical wires 88. The eddy current conductivity probe 84 is configured to contact, and contacts, one or more side portions 128a (see FIGS. 4B, 12B) of the side 128 of the fastener head 125 of the selected aircraft fastener 20a. Each eddy current conductivity probe assembly 82 further comprises the sensor 90 (see FIG. 4B) in the control box 92 (see FIG. 4B). The sensor 90 is coupled to the eddy current conductivity probe 84, via the electrical wires 88.

In yet another version of the automated fastener system 10 having the fastener conductivity testing 12 for the aircraft fastener 20, the eddy current conductivity probe assembly 82 integrated in either, the inspection center shaft 50 (see FIG. 4A), or the end effector center shaft 68 (see FIG. 12A), comprises the eddy current conductivity probe 84 having one or more coils 86 coupled to electrical wires 88. The eddy current conductivity probe 84 is configured to contact, and contacts, one or more top end portions 126a (see FIG. 4A) of the top end 126 (see FIG. 4A) of the fastener head 125 (see FIG. 4A) of the selected aircraft fastener 20a. The eddy current conductivity probe assembly 82 further comprises the sensor 90 (see FIG. 4A) in the control box 92 (see FIG. 4A). The sensor 90 is coupled to the eddy current conductivity probe 84, via the electrical wires 88.

Now referring to FIG. 2A, FIG. 2A is an illustration of a perspective view of an exemplary fastener 18 that may be used in versions of the automated fastener system 10 (see FIG. 1) of the disclosure. The fastener 18 shown in FIG. 2A is a countersunk fastener 18d in the form of a bolt 25, such as a countersunk bolt 25a. As shown in FIG. 2A, the fastener 18 has a fastener head 125, such as a countersunk fastener head 125a, having a top end 126 with an alignment portion 127, or alignment mark or point, formed on the surface of the top end 126. The alignment portion 127 is configured to align with an end 49a (see FIG. 9) of a center shaft 49 (see FIG. 9), such as an end of the inspection center shaft 50 (see FIG. 9), of the automated fastener inspection system 48 (see FIG. 9), and is also configured to align with the end 49a of the center shaft 49 (see FIG. 12A), such as the end of the end effector center shaft 68 (see FIG. 12A), of the automated fastener installation system 64 (see FIG. 12A). The top end 126 of the fastener head 125 has one or more top end portions 126a (see FIG. 3A) that, in one version, may be contacted by one or more eddy current conductivity probe assemblies 82 (see FIG. 3A) having one or more eddy current conductivity probes 84 (see FIG. 3A), to perform the fastener conductivity testing 12 (see FIG. 1) on the fastener 18, such as the countersunk fastener 18d.

As further shown in FIG. 2A, the fastener head 125 has sides 128 that are angled or sloped inwardly and downwardly from the top end 126. The sides 128 are underneath portions positioned underneath the top end 126 of the fastener head 125. The sides 128 have one or more side portions 128a (see FIG. 3B) that, in one version, may be contacted by one or more eddy current conductivity probe assemblies 82 (see FIG. 3B) having one or more eddy current conductivity probes 84 (see FIG. 3B), to perform the fastener conductivity testing 12 (see FIG. 1) on the fastener 18, such as the countersunk fastener 18d. As further shown in FIG. 2A, the fastener head 125 has a bottom end 129.

As further shown in FIG. 2A, the fastener 18 has a fastener shank 130 with a first end 132, a second end 134, and a shank body 135 disposed between the first end 132 and the second end 134. The fastener shank 130 has shank sides 131 with one or more shank side portions 131a (see FIG. 3C) that, in one version, may be contacted by one or more eddy current conductivity probe assemblies 82 (see FIG. 3C) having one or more eddy current conductivity probes 84 (see FIG. 3C), to perform the fastener conductivity testing 12 (see FIG. 1) on the fastener 18, such as the countersunk fastener 18d. As shown in FIG. 2A, the first end 132 of the fastener shank 130 is integral with the bottom end 129 of the fastener head 125.

As further shown in FIG. 2A, the fastener 18 has a tail end 136 having a first end 138, a second end 140, and a threaded body 142 disposed between the first end 138 and the second end 140. The tail end 136 has tail end portions 136a (see FIG. 3D) that, in one version, may be contacted by one or more eddy current conductivity probe assemblies 82 (see FIG. 3D) having one or more eddy current conductivity probes 84 (see FIG. 3D), to perform the fastener conductivity testing 12 (see FIG. 1) on the fastener 18, such as the countersunk fastener 18d. As shown in FIG. 2A, the first end 138 of the tail end 136 is integral with the second end 134 of the fastener shank 130. The threaded body 142 has a plurality of threads 144 (see FIG. 2A). The tail end 136 further has a pintail 145 (see FIG. 2A) at the second end 140. In one version, as shown in FIG. 3D, the tail end portion 136a contacted by the eddy current conductivity probe assembly 82 comprises the pintail 145.

Now referring to FIG. 2B, FIG. 2B is an illustration of a perspective view of another exemplary fastener 18, that may be used in versions of the automated fastener system 10 (see FIG. 1) of the disclosure. The fastener 18 shown in FIG. 2B is a counterbore fastener 18e in the form of a bolt 25, such as a counterbore bolt 25b. As shown in FIG. 2B, the fastener 18 has a fastener head 125, such as a counterbore fastener head 125b, that is flat, and has the top end 126 with the alignment portion 127, or alignment mark or point, formed on the surface of the top end 126. The alignment portion 127 is configured to align with the end 49a (see FIG. 9) of the center shaft 49 (see FIG. 9), such as the end of the inspection center shaft 50 (see FIG. 9), of the automated fastener inspection system 48 (see FIG. 9), and is also configured to align with the end 49*a* of the center shaft 49 (see FIG. 12A), such as the end of the end effector center shaft 68 (see FIG. 12A), of the automated fastener installation system 64 (see FIG. 12A).

As further shown in FIG. 2B, the fastener head 125 has sides 128*b* that form an approximate ninety degree angle with respect to the top end 126. As further shown in FIG. 2B, the fastener head 125 has the bottom end 129.

As further shown in FIG. 2B, the fastener 18 has the fastener shank 130 with the shank sides 131, the first end 132, the second end 134, and the shank body 135 disposed between the first end 132 and the second end 134. The first end 132 of the fastener shank 130 is integral with the bottom end 129 of the fastener head 125.

As further shown in FIG. 2B, the fastener 18 has the tail end 136 having the first end 138, the second end 140, and the threaded body 142 disposed between the first end 138 and the second end 140. The first end 138 of the tail end 136 is integral with the second end 134 of the fastener shank 130. The threaded body 142 has the plurality of threads 144 (see FIG. 2B). The tail end 136 further has the pintail 145 (see FIG. 2B) at the second end 140.

Like the fastener 18, such as the countersunk fastener 18*d*, shown in FIG. 2A, the fastener 18, such as the counterbore fastener 18*e*, has top end portions 126*a* of the top end 126 of the fastener head 125, side portions 128*a* of the sides 128 of the fastener head 125, shank side portions 131*a* of the shank sides 131 of the fastener shank 130, and tail end portions 136*a* of the tail end 136, each of which, in various versions, may be contacted by one or more of the eddy current conductivity probe assemblies 82 (see FIG. 1) having the one or more eddy current conductivity probes 84 (see FIG. 1), to perform the fastener conductivity testing 12 (see FIG. 1) on the fastener 18, such as the counterbore fastener 18*e*.

Now referring to FIG. 3A, FIG. 3A is an illustration of a front view of a fastener 18, such as an aircraft fastener 20, with a version of an eddy current conductivity probe assembly 82 contacting a top end portion 126*a* of a top end 126 of a fastener head 125 of the fastener 18. The fastener 18 shown in FIG. 3A is a countersunk fastener 18*d* in the form of a bolt 25, such as a countersunk bolt 25*a*. However, the counterbore fastener 18*e* of FIG. 2B or another suitable fastener 18 may also be used.

As shown in FIG. 3A, the eddy current conductivity probe assembly 82 with the eddy current conductivity probe 84 is in contact with the top end portion 126*a* of a top end 126 of the fastener head 125 of the fastener 18. As further shown in FIG. 3A, the eddy current conductivity probe 84 is in the form of an eddy current conductivity surface probe 84*a* having a probe body 146, or probe housing, coupled to, or integral with, a contact end piece 148 having a contact surface 150 in contact with the top end portion 126*a*. The probe body 146, or probe housing, preferably has a cylindrical shape or a tubular shape, and the contact end piece 148 preferably has a circular shape or a disc shape. The contact end piece 148 has a larger diameter than a diameter of the probe body 146. The larger diameter of the contact end piece 148 enables the contact surface 150 of the contact end piece 148 to contact or scan a larger top end portion 126*a* of the top end 126 of the fastener head 125.

As further shown in FIG. 3A, the eddy current conductivity probe 84 has a coil 86, such as an interior coil 86*a*, coupled to, or integral with, electrical wires 88. As further shown in FIG. 3A, the eddy current conductivity probe assembly 82 further comprises the sensor 90 in the control box 92. The sensor 90 in the control box 92 is preferably coupled to the eddy current conductivity probe 84, via the electrical wires 88. In this version, with the eddy current conductivity probe assembly 82, and in particular, the eddy current conductivity probe 84, contacting the top end portion 126*a* of a top end 126 of the fastener head 125, the eddy current conductivity probe assembly 82 may be integrated in a center shaft 49 (see FIG. 4A), such as the inspection center shaft 50 (see FIG. 4A), or the eddy current conductivity probe assembly 82 may be integrated in the center shaft 49 (see FIG. 12A), such as the end effector center shaft 68 (see FIG. 12A).

Now referring to FIG. 3B, FIG. 3B is an illustration of a front view of the fastener 18, such as the aircraft fastener 20, of FIG. 3A, with a version of eddy current conductivity probe assemblies 82 contacting side portions 128*a* of sides 128 of the fastener head 125 of the fastener 18. The fastener 18 shown in FIG. 3B is a countersunk fastener 18*d* in the form of the bolt 25, such as the countersunk bolt 25*a*. However, the counterbore fastener 18*e* of FIG. 2B or another suitable fastener 18 may also be used.

As shown in FIG. 3B the eddy current conductivity probe assembly 82, and in particular, the eddy current conductivity probes 84, are in contact with the side portions 128*a* of the sides 128 of the fastener head 125 of the fastener 18. As further shown in FIG. 3B, each eddy current conductivity probe 84 is in the form of an eddy current conductivity pencil probe 84*b* having the probe body 146 with a probe contact end 152 in contact with the side portion 128*a*.

As further shown in FIG. 3B, each eddy current conductivity probe 84 has a coil 86, such as the interior coil 86*a*, coupled to, or integral with, electrical wires 88. As further shown in FIG. 3B, the eddy current conductivity probe assembly 82 further comprises the sensor 90 in the control box 92. The sensor 90 in the control box 92 is preferably coupled to the eddy current conductivity probes 84, via the electrical wires 88. In this version, with the eddy current conductivity probe assembly 82, and in particular, the eddy current conductivity probes 84, contacting the side portions 128*a* of the sides 128 of the fastener head 125, the eddy current conductivity probe assembly 82 may be integrated in gripper fingers 51 (see FIG. 4B), such as the inspection gripper fingers 52 (see FIG. 4B), or the eddy current conductivity probe assembly 82 may be integrated in the gripper fingers 51 (see FIG. 12B), such as the end effector gripper fingers 70 (see FIG. 12B).

Now referring to FIG. 3C, FIG. 3C is an illustration of a front view of the fastener 18, such as the aircraft fastener 20, of FIG. 3A, with a version of an eddy current conductivity probe assembly 82 contacting a shank side portion 131*a* of a shank side 131 of a fastener shank 130 of the fastener 18. The fastener 18 shown in FIG. 3C is a countersunk fastener 18*d* in the form of the bolt 25, such as the countersunk bolt 25*a*. However, the counterbore fastener 18*e* of FIG. 2B or another suitable fastener 18 may also be used.

As shown in FIG. 3C the eddy current conductivity probe assembly 82, and in particular, the eddy current conductivity probe 84, is in contact with the shank side portion 131*a* of the shank side 131 of the fastener shank 130 of the fastener 18. As further shown in FIG. 3C, in one version, the eddy current conductivity probe 84 is in the form of an eddy current conductivity encircling probe 84*c* having the probe body 146, or probe housing, with the probe contact end 152 in contact with the shank side portion 131*a*, and having the end of the coil 86, such as an exterior coil 86*b*, in contact with the shank side portion 131*a* and encircling, or coiled around, an exterior portion of the probe body 146. In another version, the eddy current conductivity probe 84 is in the form of an eddy current conductivity pencil probe 84b having the probe body 146 with the probe contact end 152 in contact with the shank side portion 131a, and having the coil 86, such as the interior coil 86a, within the probe body 146.

As further shown in FIG. 3C, the coil 86, such as the exterior coil 86b, of the eddy current conductivity probe 84, such as the eddy current conductivity encircling probe 84c, is coupled to, or integral with, the electrical wires 88. As further shown in FIG. 3C, the eddy current conductivity probe assembly 82 further comprises the sensor 90 in the control box 92. The sensor 90 in the control box 92 is preferably coupled to the eddy current conductivity probe 84, via the electrical wires 88. In this version, with the eddy current conductivity probe assembly 82, and in particular, the eddy current conductivity probe 84, contacting the shank side portion 131a of the shank side 131 of the fastener shank 130, the eddy current conductivity probe assembly 82 may be integrated in the shuttle cup 46 (see FIG. 5B), such as the selected shuttle cup 46a (see FIG. 5B). As discussed below with regard to FIG. 5B, an actuator 94 may be coupled to the eddy current conductivity probe assembly 82 in the shuttle cup 46, such as the selected shuttle cup 46a.

Now referring to FIG. 3D, FIG. 3D is an illustration of a front view of the fastener 18, such as the aircraft fastener 20, of FIG. 3A, with a version of an eddy current conductivity probe assembly 82 contacting a tail end portion 136a of the tail end 136 of the fastener shank 130 of the fastener 18. The fastener 18 shown in FIG. 3B is a countersunk fastener 18d in the form of the bolt 25, such as the countersunk bolt 25a. However, the counterbore fastener 18e of FIG. 2B or another suitable fastener 18 may also be used.

As shown in FIG. 3D the eddy current conductivity probe assembly 82, and in particular, the eddy current conductivity probe 84, is in contact with the tail end portion 136a of the tail end 136 of the fastener 18. As further shown in FIG. 3D, the eddy current conductivity probe 84 is in the form of the eddy current conductivity pencil probe 84b having the probe body 146, or probe housing, with the probe contact end 152 in contact with the tail end portion 136a.

As further shown in FIG. 3D, the eddy current conductivity probe 84 has the coil 86, such as the interior coil 86a, coupled to, or integral with, electrical wires 88. As further shown in FIG. 3D, the eddy current conductivity probe assembly 82 further comprises the sensor 90 in the control box 92. The sensor 90 in the control box 92 is preferably coupled to the eddy current conductivity probe 84, via the electrical wires 88. In this version, with the eddy current conductivity probe assembly 82, and in particular, the eddy current conductivity probe 84, contacting the tail end portion 136a of the tail end 136, the eddy current conductivity probe assembly 82 may be integrated in the shuttle cup 46, such as the selected shuttle cup 46a.

Now referring to FIG. 4A, FIG. 4A is an illustration of a front view of a fastener 18, such as an aircraft fastener 20, held by gripper fingers 51, such as the inspection gripper fingers 52, at the side portions 128a of the fastener head 125, and showing the center shaft 49, such as the inspection center shaft 50, with the eddy current conductivity probe assembly 82 and the eddy current conductivity probe 84 contacting the top end portion 126a of the top end 126 of the fastener head 125 of the fastener 18. The fastener 18 shown in FIG. 4A is a countersunk fastener 18d in the form of the bolt 25, such as the countersunk bolt 25a. However, the counterbore fastener 18e of FIG. 2B or another suitable fastener 18 may also be used.

In one version, as shown in FIG. 4A, the eddy current conductivity probe assembly 82 with the eddy current conductivity probe 84 is integrated in the center shaft 49, such as the inspection center shaft 50, of the automated fastener inspection system 48. In another version, the center shaft 49 comprises the end effector center shaft 68 (see FIG. 12A), and the eddy current conductivity probe assembly 82 with the eddy current conductivity probe 84 is integrated in the end effector center shaft 68 of the automated fastener installation system 64 (see FIG. 1). As shown in FIG. 4A, the eddy current conductivity probe assembly 82, and in particular, the eddy current conductivity probe 84, such as the eddy current conductivity surface probe 84a with the contact end piece 148, is in contact with the top end portion 126a of the top end 126 of the fastener head 125 of the fastener 18, to perform the fastener conductivity testing 12 (see FIG. 1) and to measure the electrical conductivity 16 (see FIG. 1) of the fastener 18. FIG. 4A further shows the probe body 146 of the eddy current conductivity probe 84, the coil 86, such as the interior coil 86a, coupled to, or integral with, the electrical wires 88, and the sensor 90 in the control box 92 coupled to the eddy current conductivity probe 84, via the electrical wires 88.

FIG. 4A further shows the automated eddy current conductivity probe system 80 comprising the eddy current conductivity probe assembly 82 and the data connection 96. FIG. 4A further shows the processing system 98 coupled to the data connection 96 of the automated eddy current conductivity probe system 80. As shown in FIG. 4A, the processing system 98 comprises at least the control system 100, one or more power supplies 102, and the computer system 104 with the computer 106.

Now referring to FIG. 4B, FIG. 4B is an illustration of a front view of the fastener 18, such as an aircraft fastener 20, of FIG. 4A, held by the gripper fingers 51, such as the inspection gripper fingers 52, at the side portions 128a of the fastener head 125, with eddy current conductivity probe assemblies 82 and eddy current conductivity probes 84, integrated in the inspection gripper fingers 52, and contacting the side portions 128a of the fastener head 125 of the fastener 18. The fastener 18 shown in FIG. 4B is a countersunk fastener 18d in the form of the bolt 25, such as the countersunk bolt 25a. However, the counterbore fastener 18e of FIG. 2B or another suitable fastener 18 may also be used. FIG. 4B further shows the center shaft 49, such as the inspection center shaft 50, of the automated fastener inspection system 48.

In one version, as shown in FIG. 4B, each eddy current conductivity probe assembly 82 with the eddy current conductivity probe 84 is integrated in an inspection gripper finger 52 of the automated fastener inspection system 48. In another version, the gripper fingers 51 comprise the end effector gripper fingers 70 (see FIG. 12B), and each eddy current conductivity probe assembly 82 with the eddy current conductivity probe 84 is integrated in an end effector gripper finger 70. As shown in FIG. 4B, the eddy current conductivity probe assembly 82, and in particular, the eddy current conductivity probes 84, are in contact with the side portions 128a of the sides 128 of the fastener head 125 of the fastener 18, to perform the fastener conductivity testing 12 (see FIG. 1) and to measure the electrical conductivity 16 (see FIG. 1) of the fastener 18. As further shown in FIG. 34, each eddy current conductivity probe 84 is in the form of the eddy current conductivity pencil probe 84b having the probe body 146, or probe housing, with the probe contact end 152 in contact with the side portion 128a. FIG. 4B further shows the probe body 146 of each eddy current conductivity probe 84, the coil 86, such as the interior coil 86a, coupled to, or integral with, the electrical wires 88, and the sensor 90 in the control box 92 coupled to the eddy current conductivity probe 84, via the electrical wires 88.

FIG. 4B further shows the automated eddy current conductivity probe system 80 comprising the eddy current conductivity probe assembly 82 and the data connection 96. FIG. 4B further shows the processing system 98 coupled to the data connection 96 of the automated eddy current conductivity probe system 80. As shown in FIG. 4B, the processing system 98 comprises at least the control system 100, one or more power supplies 102, and the computer system 104 with the computer 106.

Now referring to FIG. 4C, FIG. 4C is an illustration of a top sectional view of the fastener 18, such as the aircraft fastener 20, of FIG. 4B, held by the gripper fingers 51, such as the inspection gripper fingers 52, of the automated fastener inspection system 48, with the eddy current conductivity probe assemblies 82 having the eddy current conductivity probes 84 integrated in the inspection gripper fingers 52, and contacting the side portions 128a of the fastener head 125 of the fastener 18. FIG. 4C further shows each eddy current conductivity probe 84 with the coil 86 coupled to, or integral with, the electrical wires 88.

FIG. 4C shows in one version three (3) gripper fingers 51, such as three (3) inspection gripper fingers 52, each with the eddy current conductivity probe assembly 82 having the eddy current conductivity probe 84, surrounding the fastener head 125, and in contact with the side portions 128a of the fastener head 125 of the fastener 18. However, in other versions, two (2) gripper fingers 51, such as two (2) inspection gripper fingers 52, or more than three (3) gripper fingers 51, such as more than three (3) inspection gripper fingers 52, may be used in the automated fastener inspection system 48 to hold the fastener 18. Similarly, with the end effector 66 (see FIG. 12B) of the automated fastener installation system 64 (see FIG. 1), the end effector 66 in one version has three (3) gripper fingers 51, such as three (3) end effector gripper fingers 70, each with the eddy current conductivity probe assembly 82 having the eddy current conductivity probe 84 in contact with the fastener 18. However, in other versions, two (2) gripper fingers 51, such as two (2) end effector gripper fingers 70, or more than three (3) gripper fingers 51, such as more than three (3) end effector gripper fingers 70, may be used in the automated fastener installation system 64.

Now referring to FIG. 5A, FIG. 5A is an illustration of a partial sectional front view of a version of a fastener 18, such as an aircraft fastener 20, for example, a selected fastener 18a, countersunk in a shuttle cup 46, such as a selected shuttle cup 46a, of the automated fastener shuttle assembly 44, with an eddy current conductivity probe assembly 82 integrated within an interior 154 of the shuttle cup 46, and contacting the side portion 128a of the side 128 of the fastener head 125 of the fastener 18. The fastener 18 shown in FIG. 5A is a countersunk fastener 18d in the form of the bolt 25, such as the countersunk bolt 25a. However, the counterbore fastener 18e of FIG. 2B or another suitable fastener 18 may also be used.

As shown in FIG. 5A, the fastener 18 is countersunk in a countersunk position 155 in an interior through opening 156 formed through the center of the shuttle cup 46, such as the selected shuttle cup 46a. The fastener 18 is supported in the shuttle cup 46 for transport by the automated fastener shuttle assembly 44 between the automated fastener holder assembly 40 (see FIGS. 1, 7) and the automated fastener inspection system 48 (see FIGS. 1, 7), but in one version, the fastener 18 does not have to be retained with any retention features or devices in the shuttle cup 46, such as the selected shuttle cups 46a.

As shown in FIG. 5A the eddy current conductivity probe assembly 82, and in particular, the probe contact end 152 of the eddy current conductivity probe 84, is in contact with the side portion 128a of the side 128 of the fastener head 125 of the fastener 18. As further shown in FIG. 5A, in one version, the eddy current conductivity probe 84, such as in the form of the eddy current conductivity encircling probe 84c, has the coil 86, such as the exterior coil 86b, encircling, or coiled around, an exterior portion of the probe body 146, and in contact with the side portion 128a of the fastener head 125. The coil 86 is coupled to, or integral with, the electrical wires 88 (see FIG. 5A).

As further shown in FIG. 5A, the eddy current conductivity probe assembly 82 further comprises the sensor 90 in the control box 92 coupled to the eddy current conductivity probe 84, via the electrical wires 88. In this version, with the eddy current conductivity probe assembly 82, and in particular, the eddy current conductivity probe 84, contacting the side portion 128a of the fastener head 125, the control box 92 contains the eddy current conductivity probe assembly 82 and also contains the actuator 94 coupled to the eddy current conductivity probe assembly 82 and to the eddy current conductivity probe 84. In one version, as shown in FIG. 5A, the actuator 94 comprises a spring-loaded actuator 94a, having a spring 158 coupled to a spring retention mechanism 160. FIG. 5A shows one version of the actuator 94, such as the spring-loaded actuator 94a, for example, a passive actuator. The actuator 94 may further comprise another suitable type of passive actuator.

As shown in FIG. 5A, the actuator 94 is coupled to the eddy current conductivity probe 84 and to the eddy current conductivity probe assembly 82 in the shuttle cup 46, such as the selected shuttle cup 46a, and when the spring retention mechanism 160 releases the spring 158, it causes the actuator 94 to move the eddy current conductivity probe 84 and the eddy current conductivity probe assembly 82 against the fastener 18, such as the selected fastener 18a, so that the probe contact end 152 and the coil 86 contact the side portion 128a of the fastener head 125 of the fastener 18, to perform the fastener conductivity testing 12 (see FIG. 1) and to measure the electrical conductivity 16 (see FIG. 1) of the fastener 18.

FIG. 5A further shows the automated eddy current conductivity probe system 80 comprising the eddy current conductivity probe assembly 82 and the data connection 96. FIG. 5A further shows the processing system 98 coupled to the data connection 96 of the automated eddy current conductivity probe system 80. As shown in FIG. 5A, the processing system 98 comprises at least the control system 100, one or more power supplies 102, and the computer system 104 with the computer 106.

Now referring to FIG. 5B, FIG. 5B is an illustration of a partial sectional front view of another version of a fastener 18, such as an aircraft fastener 20, for example, a selected fastener 18a, countersunk in the shuttle cup 46, such as the selected shuttle cup 46a, of the automated fastener shuttle assembly 44, with the eddy current conductivity probe assembly 82 having the eddy current conductivity probe 84 integrated within the interior 154 of the shuttle cup 46, and contacting the shank side portion 131a of the shank side 131 of the fastener shank 130 of the fastener 18. The fastener 18 shown in FIG. 5B is a countersunk fastener 18d in the form of the bolt 25, such as the countersunk bolt 25a. However, the counterbore fastener 18e of FIG. 2B or another suitable fastener 18 may also be used.

As shown in FIG. 5B, the fastener 18 is countersunk in the countersunk position 155 in the interior through opening 156 formed through the center of the shuttle cup 46, such as the selected shuttle cup 46a. The fastener 18 is supported in the shuttle cup 46 for transport by the automated fastener shuttle assembly 44 between the automated fastener holder assembly 40 (see FIGS. 1, 7) and the automated fastener inspection system 48 (see FIGS. 1, 7), but the fastener 18 does not have to be retained with any retention features or devices in the shuttle cup 46.

As shown in FIG. 5B the eddy current conductivity probe assembly 82, and in particular, the probe contact end 152 of the eddy current conductivity probe 84, is in contact with the shank side portion 131a of the shank side 131 of the fastener shank 130 of the fastener 18. As further shown in FIG. 5B, in one version, the eddy current conductivity probe 84, such as in the form of the eddy current conductivity encircling probe 84c, has the coil 86, such as the exterior coil 86b, encircling, or coiled around, an exterior portion of the probe body 146, and in contact with the shank side portion 131a of the fastener shank 130. The coil 86 is coupled to, or integral with, the electrical wires 88 (see FIG. 5B).

As further shown in FIG. 5B, the eddy current conductivity probe assembly 82 further comprises the sensor 90 in the control box 92 coupled to the eddy current conductivity probe 84, via the electrical wires 88. In this version, with the eddy current conductivity probe assembly 82, and in particular, the eddy current conductivity probe 84, contacting the side portion 128a of the fastener head 125, the control box 92 contains the eddy current conductivity probe assembly 82 and also contains the actuator 94, such as a piston actuator 94b, coupled to the eddy current conductivity probe assembly 82 and to the eddy current conductivity probe 84. In one version, as shown in FIG. 5B, the actuator 94, such as the piston actuator 94b, has a piston 162 coupled to a drive mechanism 164, such as a mechanical drive mechanism, a motor, or another suitable drive mechanism. FIG. 5B shows one version of the actuator 94, such as the piston actuator 94b, for example, a linear actuator, and an active actuator. The actuator 94 may further comprise a hydraulic actuator, a pneumatic actuator, a mechanical actuator, or another suitable type of active actuator.

As shown in FIG. 5B, the actuator 94 is coupled to the eddy current conductivity probe 84 and to the eddy current conductivity probe assembly 82 in the shuttle cup 46, such as the selected shuttle cup 46a, and is configured to move, and moves, the eddy current conductivity probe 84 and the eddy current conductivity probe assembly 82 against the fastener 18, such as the selected fastener 18a, so that the probe contact end 152 and the coil 86 contact the shank side portion 131a of the fastener shank 130 of the fastener 18, to perform the fastener conductivity testing 12 (see FIG. 1) and to measure the electrical conductivity 16 (see FIG. 1) of the fastener 18.

FIG. 5B further shows the automated eddy current conductivity probe system 80 comprising the eddy current conductivity probe assembly 82 and the data connection 96. FIG. 5B further shows the processing system 98 coupled to the data connection 96 of the automated eddy current conductivity probe system 80. As shown in FIG. 5B, the processing system 98 comprises at least the control system 100, one or more power supplies 102, and the computer system 104 with the computer 106.

Figure 6:
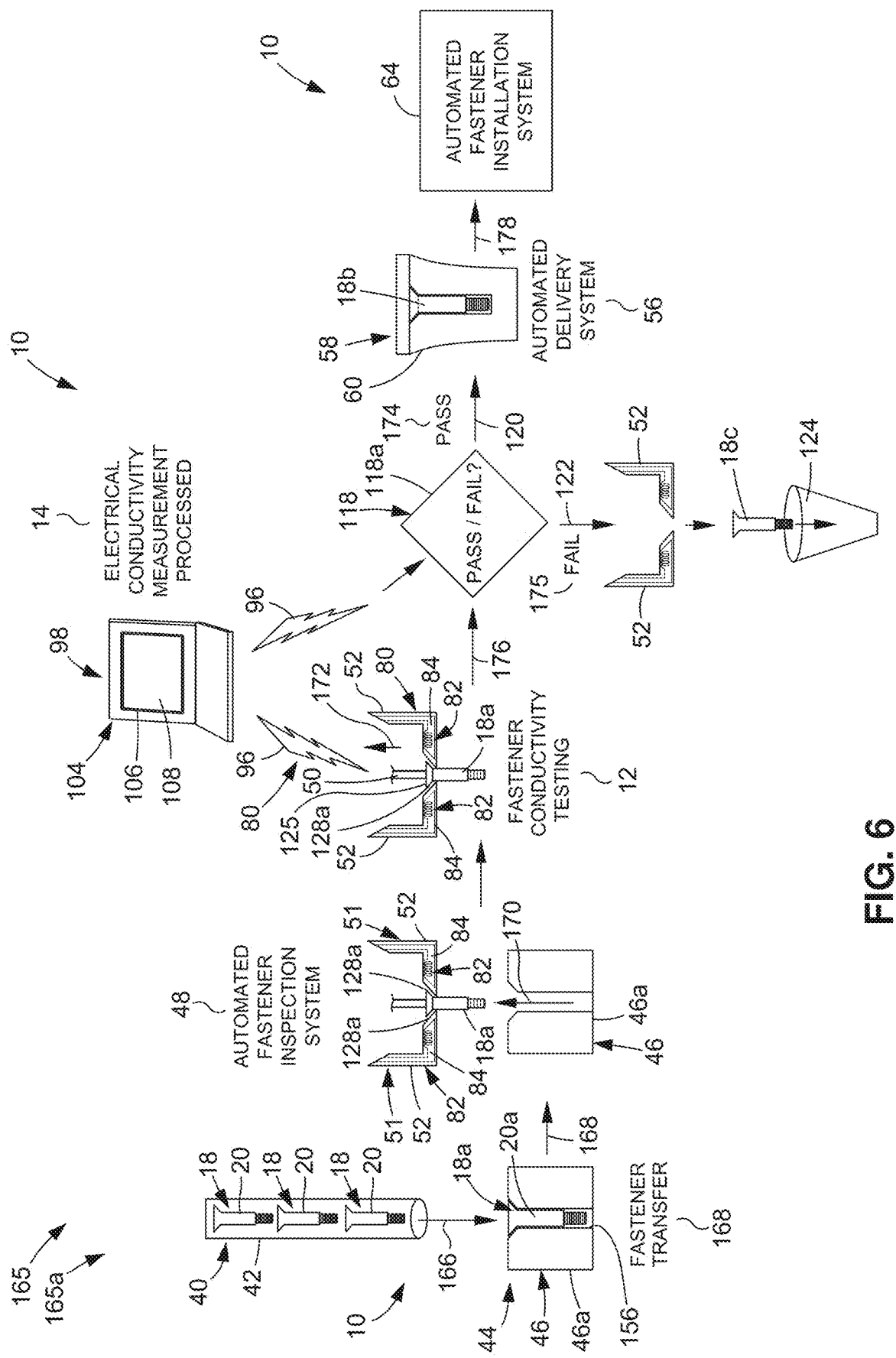
FIG. 6 is an illustration of a schematic diagram of a process flow using a version of an exemplary automated fastener system of the disclosure, showing fastener conductivity testing of a fastener using eddy current conductivity probe assemblies integrated in inspection gripper fingers.

Now referring to FIG. 6, FIG. 6 is an illustration of a schematic diagram of a process flow 165, such as a first process flow 165a, using an exemplary version of the automated fastener system 10 of the disclosure, showing fastener conductivity testing 12 of a fastener 18, such as a selected fastener 18a, for example, an aircraft fastener 20, such as a selected aircraft fastener 20a, using eddy current conductivity probe assemblies 82 integrated in gripper fingers 51, such as inspection gripper fingers 52, of the automated fastener inspection system 48. FIG. 6 shows the automated fastener holder assembly 40 with the fastener holder 42 holding fasteners 18, such as aircraft fasteners 20.

As shown in FIG. 6, a selected fastener 18a, such as a selected aircraft fastener 20a, is released from the fastener holder 42, via a fastener release action 166, into the interior through opening 156 of the shuttle cup 46, such as the selected shuttle cup 46a, of the automated fastener shuttle assembly 44. The selected fastener 18a, such as the selected aircraft fastener 20a, is then transported in the selected shuttle cup 46a of the automated fastener shuttle assembly 44 in a fastener transfer 168 (see FIG. 6) from the automated fastener holder assembly 40 to the automated fastener inspection system 48. The shuttle cup 46, such as the selected shuttle cup 46a, may be moved via an automatic transport mechanism (not shown) of the automated fastener shuttle assembly 44, for example, the automatic transport mechanism may comprise a rail or a track system along which the selected shuttle cup 46 automatically moves back and forth between the automated fastener holder assembly 40 to the automated fastener inspection system 48. The automatic transport mechanism may also comprise another suitable transport system to automatically move the shuttle cups 46 between the automated fastener holder assembly 40 and the automated fastener inspection system 48.

As further shown in FIG. 6, the gripper fingers 51, such as the inspection gripper fingers 52, having the eddy current conductivity probe assemblies 82 with the eddy current conductivity probes 84 pick up the selected fastener 18a from the selected shuttle cup 46a, in a pick-up action 170, and the selected fastener 18a undergoes fastener inspection by the automated fastener inspection system 48. The inspection gripper fingers 52 grip the selected fastener 18a during the fastener inspection. In this version, after inspection of the selected fastener 18a, the selected fastener 18a undergoes fastener conductivity testing 12 with the eddy current conductivity probe assemblies 82 and the eddy current conductivity probes 84, integrated in the inspection gripper fingers 52, contacting the side portions 128a of the fastener head 125 of the selected fastener 18a. Alternatively, the selected fastener 18a may undergo fastener conductivity testing 12 before inspection of the selected fastener 18a. Further, alternatively, as shown in FIG. 4A, the eddy current conductivity probe assembly 82 and the eddy current conductivity probe 84 may be integrated in the inspection center shaft 50 (see also FIG. 6) and contact the top end portion 126a (see FIG. 2A) of the top end 126 (see FIG. 2A) of the fastener head 125.

As shown in FIG. 6, after inspection of the selected fastener 18a by the automated fastener inspection system 48, the selected fastener 18a undergoes fastener conductivity testing 12 and measurement by the automated eddy current conductivity probe system 80. As shown in FIG. 6, the eddy current conductivity probe assemblies 82 and the eddy current conductivity probes 84 contact the side portions 128a of the fastener head 125 of the selected fastener 18a, to perform the fastener conductivity testing 12 and to obtain the electrical conductivity measurement 14 of the selected fastener 18a. As further shown in FIG. 6, the electrical conductivity measurement 14 is sent in a transmission action 172, via a data connection 96 to the processing system 98, where the electrical conductivity measurement 14 is processed. As further shown in FIG. 6, the processing system 98 comprises the computer system 104 with the computer 106 and the computer console 108. The control logic 112 (see FIG. 1) implemented by a computer software program 110 (see FIG. 1) of the processing system 98 compares the electrical conductivity measurement 14 of the selected fastener 18a against a predetermined electrical conductivity value range 114 (see FIG. 1) of a predetermined fastener material 115 (see FIG. 1), to obtain a fastener material determination 116 (see FIG. 1) of the selected fastener 18a, and to accept or to reject the selected fastener 18a based on the fastener material determination 116.

The control logic 112 of the processing system 98 transmits, via a data connection 96 (see FIG. 6), to an operator or to a user, an automated command 118 (see FIG. 6) of a pass/fail command 118a (see FIG. 6), to accept or to reject the selected fastener 18a. As shown in FIG. 6, if it is a pass 174, the selected fastener 18a is accepted, to obtain a fastener acceptance 120 of an accepted fastener 18b. As further shown in FIG. 6, if it is a fail 175, the selected fastener 18a is rejected, to obtain a fastener rejection 122 of a rejected fastener 18c. In the case of a fail 175, in one version, the rejected fastener 18c is released by the inspection gripper fingers 52 of the automated fastener inspection system 48, and the rejected fastener 18c is discarded in a fastener rejection container 124. In another version, the rejected fastener 18c may be discarded in another manner.

As further shown in FIG. 6, in the case of a pass 174, the accepted fastener 18b is released by the inspection gripper fingers 52 of the automated fastener inspection system 48 and transferred, in a transfer action 176, from the automated fastener inspection system 48 to the delivery device 58, such as the delivery shuttle 60, of the automated delivery system 56. For example, the inspection gripper fingers 52 may release or drop the accepted fastener 18b into the delivery device 58, such as the delivery shuttle 60, positioned under the accepted fastener 18b. As further shown in FIG. 6, the accepted fastener 18b in the delivery device 58 is transported and delivered, in a delivery action 178, such as in the transfer tube 62 (see FIG. 1), for example, the vacuum tube 62a (see FIG. 1), the pressure tube 62b (see FIG. 1), or another suitable transfer tube or device, from the automated fastener inspection system 48 to the automated fastener installation system 64 for installation in a structure 22 (see FIG. 1), such as an aircraft structure 24 (see FIG. 1).

Figure 7:
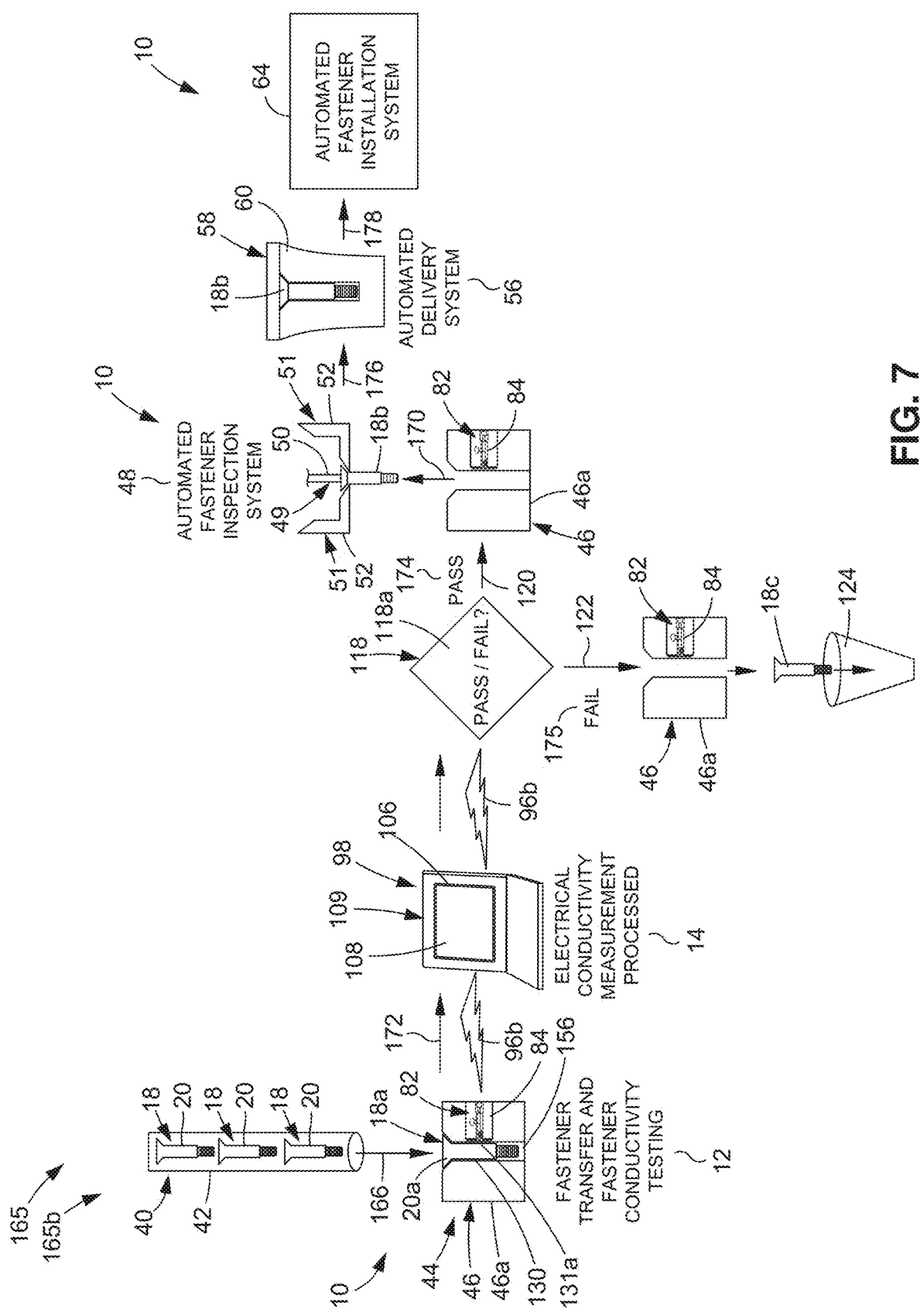
FIG. 7 is an illustration of a schematic diagram of a process flow using another version of an exemplary automated fastener system of the disclosure, showing fastener conductivity testing of a fastener using an eddy current conductivity probe assembly integrated in a shuttle cup.

Now referring to FIG. 7, FIG. 7 is an illustration of a schematic diagram of a process flow 165, such as a second process flow 165b, using another version of an exemplary automated fastener system 10 of the disclosure, showing fastener conductivity testing 12 of a fastener 18, such as a selected fastener 18a, for example, an aircraft fastener 20, such as a selected aircraft fastener 20a, using an eddy current conductivity probe assembly 82 integrated in a shuttle cup 46, such as a selected shuttle cup 46a, and undergoing the fastener conductivity testing 12 prior to inspection of the selected fastener 18.

FIG. 7 shows the automated fastener holder assembly 40 with the fastener holder 42 holding fasteners 18, such as aircraft fasteners 20. As shown in FIG. 7, a selected fastener 18a, such as a selected aircraft fastener 20a, is released or dropped from the fastener holder 42, via the fastener release action 166, into the interior through opening 156 of the shuttle cup 46, such as the selected shuttle cup 46a, of the automated fastener shuttle assembly 44. As shown in FIG. 6, the shuttle cup 46, such as the selected shuttle cup 46a, has the eddy current conductivity probe assembly 82 with the eddy current conductivity probe 84 integrated in the shuttle cup 46, such as the selected shuttle cup 46a, and contacting the selected fastener 18a on the shank side portion 131a of the fastener shank 130. Alternatively, as shown in FIG. 5A, the eddy current conductivity probe assembly 82 with the eddy current conductivity probe 84 is integrated in the shuttle cup 46, such as the selected shuttle cup 46a, and contacts the side portion 128a of the fastener head 125 of the selected fastener 18a.

As shown in FIG. 7, the selected fastener 18a, such as the selected aircraft fastener 20a, undergoes fastener conductivity testing 12 with the eddy current conductivity probe assembly 82 and the eddy current conductivity probe 84 integrated in the shuttle cup 46, such as the selected shuttle cup 46a, contacting the shank side portion 131a of the fastener shank 130 of the selected fastener 18a, such as the selected aircraft fastener 20a. The eddy current conductivity probe assembly 82 with the eddy current conductivity probe 84 contacts the selected fastener 18a to perform the fastener conductivity testing 12 and to obtain the electrical conductivity measurement 14 of the selected fastener 18a. As further shown in FIG. 7, the electrical conductivity measurement 14 is sent in the transmission action 172, via a wireless data connection 96b, to the processing system 98, where the electrical conductivity measurement 14 is processed. As shown in FIG. 7, the processing system 98 comprises the computer system 104 with the computer 106 and the computer console 108. The control logic 112 (see FIG. 1) implemented by the computer software program 110 (see FIG. 1) of the processing system 98 compares the electrical conductivity measurement 14 of the selected fastener 18a against the predetermined electrical conductivity value range 114 (see FIG. 1) of the predetermined fastener material 115 (see FIG. 1), to obtain the fastener material determination 116 (see FIG. 1) of the selected fastener 18a, and to accept or to reject the selected fastener 18a based on the fastener material determination 116.

The control logic 112 of the processing system 98 transmits, via a wireless data connection 96b (see FIG. 7), to an operator or to a user, the automated command 118 (see FIG. 7) of the pass/fail command 118a (see FIG. 7), to accept or to reject the selected fastener 18a. As shown in FIG. 7, if it is a pass 174, the selected fastener 18a is accepted, to obtain the fastener acceptance 120 of the accepted fastener 18b. As shown in FIG. 7, if it is a fail 175, the selected fastener 18a is rejected, to obtain the fastener rejection 122 of the rejected fastener 18c. In the case of a fail 175, in one version, the rejected fastener 18c is released by the shuttle cup 46, such as the selected shuttle cup 46a, of the automated fastener shuttle assembly 44, and the rejected fastener 18c is discarded in the fastener rejection container 124. In another version, the rejected fastener 18c may be discarded in another manner.

As further shown in FIG. 7, in the case of a pass 174, the accepted fastener 18b is transported by the shuttle cup 46, such as the selected shuttle cup 46a, having the eddy current conductivity probe assembly 82 and the eddy current conductivity probe 84, from the automated fastener holder assembly 40 to the automated fastener inspection system 48. The shuttle cup 46, such as the selected shuttle cup 46a, may be moved via the automatic transport mechanism (not shown) of the automated fastener shuttle assembly 44, for example, the automatic transport mechanism may comprise a rail or a track system along which the selected shuttle cup 46 automatically moves back and forth between the automated fastener holder assembly 40 to the automated fastener inspection system 48. The automatic transport mechanism may also comprise another suitable transport system to automatically move the shuttle cups 46 between the automated fastener holder assembly 40 and the automated fastener inspection system 48.

As further shown in FIG. 7, the gripper fingers 51, such as the inspection gripper fingers 52, of the automated fastener inspection system 48 pick up the accepted fastener 18b from the shuttle cup 46, such as the selected shuttle cup 46a, in the pick-up action 170. The inspection gripper fingers 52 grip the accepted fastener 18b during inspection of the accepted fastener 18b by the automated fastener inspection system 48. FIG. 7 further shows the center shaft 49, such as the inspection center shaft 50, of the automated fastener inspection system 48.

As further shown in FIG. 7, after the accepted fastener 18b is inspected by the automated fastener inspection system 48, the accepted fastener 18b is released by the inspection gripper fingers 52 of the automated fastener inspection system 48. The accepted fastener 18b is transferred, in the transfer action 176, from the automated fastener inspection system 48 to the delivery device 58, such as the delivery shuttle 60, of the automated delivery system 56. For example, the inspection gripper fingers 52 may release or drop the accepted fastener 18b into the delivery device 58, such as the delivery shuttle 60, positioned under the accepted fastener 18b. As further shown in FIG. 7, the accepted fastener 18b in the delivery device 58 is transported and delivered, in the delivery action 178, such as in the transfer tube 62 (see FIG. 1), for example, the vacuum tube 62a (see FIG. 1), the pressure tube 62b (see FIG. 1), or another suitable transfer tube or device, from the automated fastener inspection system 48 to the automated fastener installation system 64 for installation in a structure 22 (see FIG. 1), such as an aircraft structure 24 (see FIG. 1).

Figure 8:
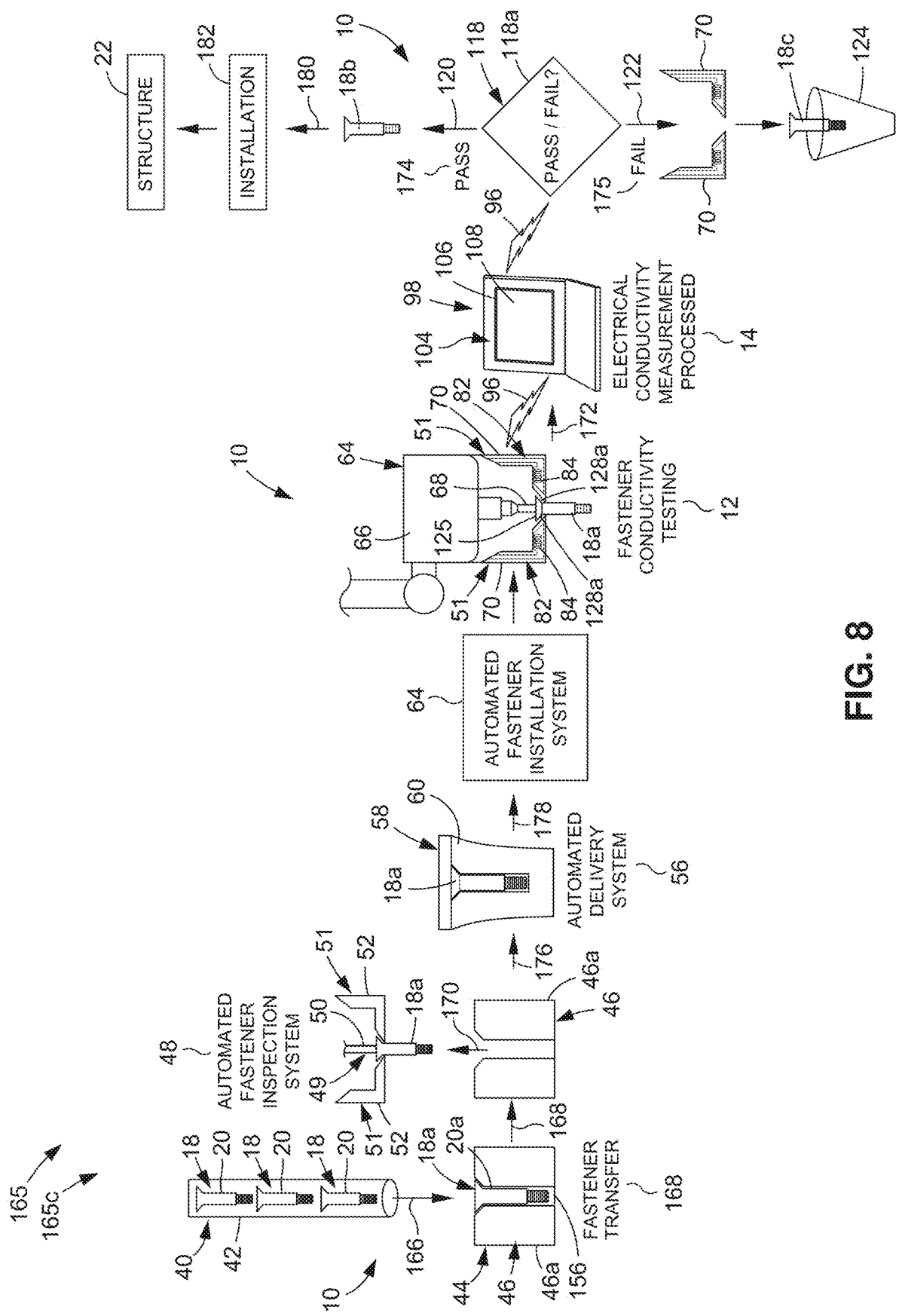
FIG. 8 is an illustration of a schematic diagram of a process flow using another version of an exemplary automated fastener system of the disclosure, showing fastener conductivity testing of a fastener using eddy current conductivity probe assemblies integrated in end effector gripper fingers.

Now referring to FIG. 8, FIG. 8 is an illustration of a schematic diagram of a process flow 165, such as a third process flow 165c, using yet another version of an exemplary automated fastener system 10 of the disclosure, showing fastener conductivity testing 12 of a fastener 18, such as a selected fastener 18a, for example, an aircraft fastener 20, such as a selected aircraft fastener 20a, using eddy current conductivity probe assemblies 82 integrated in gripper fingers 51, such as end effector gripper fingers 70, of the automated fastener installation system 64. FIG. 8 shows the automated fastener holder assembly 40 with the fastener holder 42 holding fasteners 18, such as aircraft fasteners 20.

As shown in FIG. 8, a selected fastener 18a, such as a selected aircraft fastener 20a, is released from the fastener holder 42, via the fastener release action 166, into the interior through opening 156 of the shuttle cup 46, such as the selected shuttle cup 46a, of the automated fastener shuttle assembly 44. The selected fastener 18a, such as the selected aircraft fastener 20a, is then transported in the shuttle cup 46, such as the selected shuttle cup 46a, of the automated fastener shuttle assembly 44, in the fastener transfer 168 (see FIG. 8), from the automated fastener holder assembly 40 to the automated fastener inspection system 48. The shuttle cup 46, such as the selected shuttle cup 46a, may be moved via the automatic transport mechanism (not shown) of the automated fastener shuttle assembly 44, for example, the automatic transport mechanism may comprise a rail or a track system along which the selected shuttle cup 46 automatically moves back and forth between the automated fastener holder assembly 40 to the automated fastener inspection system 48. The automatic transport mechanism may also comprise another suitable transport system to automatically move the shuttle cups 46 between the automated fastener holder assembly 40 and the automated fastener inspection system 48.

As further shown in FIG. 8, the gripper fingers 51, such as the inspection gripper fingers 52, of the automated fastener inspection system 48 pick up the selected fastener 18a from the shuttle cup 46, such as the selected shuttle cup 46a, in the pick-up action 170, and the selected fastener 18a undergoes fastener inspection by the automated fastener inspection system 48. The inspection gripper fingers 52 grip the selected fastener 18a during the fastener inspection. The automated fastener inspection system 48 has the center shaft 49 (see FIG. 8), such as the inspection center shaft 50 (see FIG. 8).

As further shown in FIG. 8, after inspection of the selected fastener 18a, the selected fastener 18a is released by the inspection gripper fingers 52 of the automated fastener inspection system 48, and transferred, in the transfer action 176, from the automated fastener inspection system 48 to the delivery device 58, such as the delivery shuttle 60, of the automated delivery system 56. For example, the inspection gripper fingers 52 may release or drop the selected fastener 18a into the delivery device 58, such as the delivery shuttle 60, positioned under the selected fastener 18a. As further shown in FIG. 8, the selected fastener 18a in the delivery device 58 is transported and delivered, in the delivery action 178, such as in the transfer tube 62 (see FIG. 1), for example, the vacuum tube 62a (see FIG. 1), the pressure tube 62b (see FIG. 1), or another suitable transfer tube or device, from the automated fastener inspection system 48 to the automated fastener installation system 64 for fastener conductivity testing 12.

As further shown in FIG. 8, in this version, after delivery of the selected fastener 18a to the automated fastener installation system 64, the selected fastener 18a undergoes fastener conductivity testing 12 with the eddy current conductivity probe assemblies 82 and the eddy current conductivity probes 84 integrated in the gripper fingers 51, such as the end effector gripper fingers 70, coupled to the end effector 66, and contacting the side portions 128a of the fastener head 125 of the selected fastener 18a. Alternatively, as shown in FIG. 12A, the eddy current conductivity probe assembly 82 and the eddy current conductivity probe 84 may be integrated in the end effector center shaft 68 (see also FIG. 8), and contact the top end portion 126a of the top end 126 of the fastener head 125.

In this version, as shown in FIG. 8, the eddy current conductivity probe assemblies 82 with the eddy current conductivity probes 84 contact the selected fastener 18a to perform the fastener conductivity testing 12, and to obtain the electrical conductivity measurement 14 of the selected fastener 18a. As further shown in FIG. 8, the electrical conductivity measurement 14 is sent in the transmission action 172, via the data connection 96, to the processing system 98, where the electrical conductivity measurement 14 is processed. As further shown in FIG. 8, the processing system 98 comprises the computer system 104 with the computer 106 and the computer console 108. The control logic 112 (see FIG. 1) implemented by a computer software program 110 (see FIG. 1) of the processing system 98 compares the electrical conductivity measurement 14 of the selected fastener 18a against the predetermined electrical conductivity value range 114 (see FIG. 1) of the predetermined fastener material 115 (see FIG. 1), to obtain the fastener material determination 116 (see FIG. 1) of the selected fastener 18*a*, and to accept or to reject the selected fastener 18*a* based on the fastener material determination 116.

The control logic 112 of the processing system 98 transmits, via the data connection 96 (see FIG. 8), to an operator or to a user, the automated command 118 (see FIG. 8) of the pass/fail command 118*a* (see FIG. 8), to accept or to reject the selected fastener 18*a*. As shown in FIG. 8, if it is a pass 174, the selected fastener 18*a* is accepted, to obtain the fastener acceptance 120 of the accepted fastener 18*b*. As shown in FIG. 8, if it is a fail 175, the selected fastener 18*a* is rejected, to obtain the fastener rejection 122 of the rejected fastener 18*c*. In the case of a fail 175, in one version, the rejected fastener 18*c* is released by the end effector gripper fingers 70 of the automated fastener installation system 64, and the rejected fastener 18*c* is discarded in the fastener rejection container 124. In another version, the rejected fastener 18*c* may be discarded in another manner.

As further shown in FIG. 8, in the case of a pass 174, the accepted fastener 18*b* is installed, in an installation action 180, for installation 182, by the automated fastener installation system 64 in a structure 22, such as an aircraft structure 24 (see FIG. 1).

As further shown in FIG. 8, in the case of a pass 174, the automated fastener installation system 64 with the end effector gripper fingers 70 installs the accepted fastener 18*b*, in an installation action 180, to achieve an installation 182 of the accepted fastener 18*b* in a structure 22, such as an aircraft structure 24 (see FIG. 1).

Now referring to FIG. 9, FIG. 9 is an illustration of a front perspective view of an exemplary automated fastener inspection system 48 that may be used in a version of the automated fastener system 10 (see FIG. 1) and the automated method 250 (see FIG. 14) of the disclosure. FIG. 9 shows gripper fingers 51, such as inspection gripper fingers 52, holding or gripping a fastener 18, such as an aircraft fastener 20, at the side portions 128*a* of the sides 128 of the fastener head 125, such as underneath the top end 126 of the fastener head 125. The fastener 18 may comprise the selected fastener 18*a* (see FIG. 6) prior to the fastener conductivity testing 12, or the fastener 18 may comprise the accepted fastener 18*b* (see FIG. 7) if accepted after the fastener conductivity testing 12.

As shown in FIG. 9, the automated fastener inspection system 48 has the center shaft 49, such as the inspection center shaft 50, with the end 49*a* of the center shaft 49, aligned with, and in contact with, the alignment portion 127 on the top end 126 of the fastener head 125. If fastener conductivity testing 12 is performed at the automated fastener inspection system 48, each inspection gripper finger 52 may include the eddy current conductivity probe assembly 82 and the eddy current conductivity probe 84 within the interior of the inspection gripper finger 52, as shown in FIGS. 4B and 6, or the inspection center shaft 50 may include the eddy current conductivity probe assembly 82 and the eddy current conductivity probe 84 within the interior of the inspection center shaft 50, as shown in FIG. 4A.

As further shown in FIG. 9, in one version, the automated fastener inspection system 48 has the camera 54 and the laser scanner 55, which are both configured to perform inspection of the fastener 18, such as the aircraft fastener 20, held and gripped by the inspection gripper fingers 52 and aligned with the inspection center shaft 50. FIG. 9 further shows a controller 184 configured to control the movement of the inspection gripper fingers 52 and the inspection center shaft 50.

The automated fastener inspection system 48, shown in FIG. 9, is an example of one version of an automated fastener inspection system 48 that may be used in the automated fastener system 10 (see FIG. 1) and the automated method 250 (see FIG. 14) of the disclosure. However, other versions of an automated fastener inspection system with different components, or added components, to achieve inspection of the fastener 18 may be used, as long as the automated fastener inspection system has at least the two or more inspection gripper fingers 52 and the inspection center shaft 50, in which the eddy current conductivity probe assembly 82 and the eddy current conductivity probe 84 may be integrated in either.

Figure 10B:
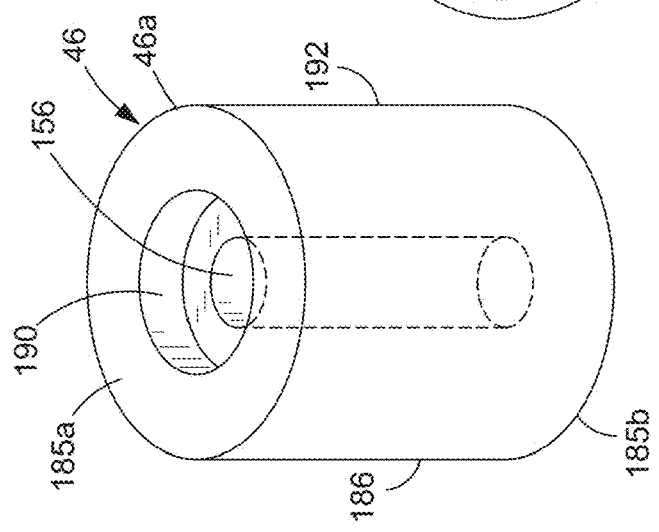
FIG. 10B is an illustration of a top front perspective view of another exemplary version of a shuttle cup of an automated fastener shuttle assembly used in a version of an automated fastener system and an automated method of the disclosure.
Figure 10A:
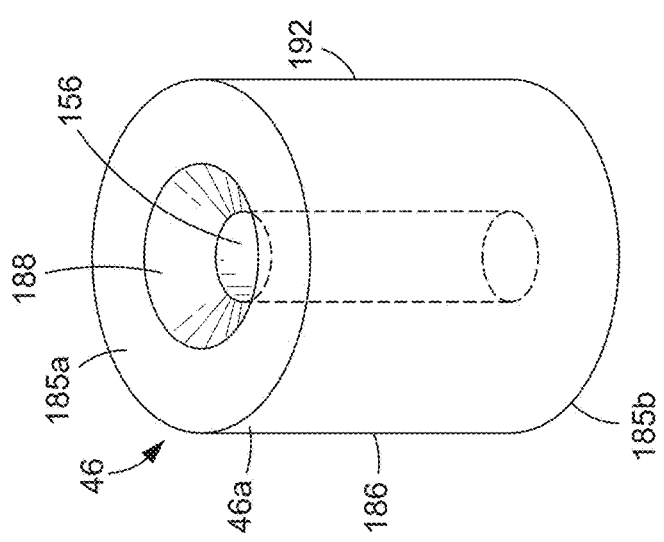
FIG. 10A is an illustration of a top front perspective view of an exemplary version of a shuttle cup of an automated fastener shuttle assembly used in a version of an automated fastener system and an automated method of the disclosure.

Now referring to FIG. 10A, FIG. 10A is an illustration of a top front perspective view of an exemplary version of a shuttle cup 46, such as a selected shuttle cup 46*a*, of an automated fastener shuttle assembly 44 (see FIG. 1) that may be used in a version of the automated fastener system 10 (see FIG. 1) and the automated method 250 (see FIG. 14) of the disclosure. As shown in FIG. 10A, the shuttle cup 46, such as the selected shuttle cup 46*a*, has a first end 185*a*, a second end 185*b*, and a shuttle cup body 186 formed between the first end 185*a* and the second end 185*b*. As further shown in FIG. 10A, the shuttle cup 46, such as the selected shuttle cup 46*a*, has the interior through opening 156 formed through the shuttle cup body 186. In this version, as shown in FIG. 10A, the shuttle cup 46, such as the selected shuttle cup 46*a*, further has a countersunk opening portion 188 configured to support the countersunk fastener head 125*a* (see FIG. 2A) of the countersunk fastener 18*d* (see FIG. 2A). The fastener shank 130 (see FIG. 2A) and the tail end 136 (see FIG. 2A) of the countersunk fastener 18*d* (see FIG. 2A) are configured for insertion through a portion of the interior through opening 156. The length of the countersunk fastener 18*d* does not typically extend through the entire length of the interior through opening 156.

Now referring to FIG. 10B, FIG. 10B is an illustration of a top front perspective view of another exemplary version of a shuttle cup 46, such as a selected shuttle cup 46*a*, of an automated fastener shuttle assembly 44 (see FIG. 1) that may be used in a version of the automated fastener system 10 (see FIG. 1) and the automated method 250 (see FIG. 14) of the disclosure. As shown in FIG. 10B, the shuttle cup 46, such as the selected shuttle cup 46*a*, has the first end 185*a*, the second end 185*b*, and the shuttle cup body 186 formed between the first end 185*a* and the second end 185*b*. As further shown in FIG. 10B, the shuttle cup 46, such as the selected shuttle cup 46*a*, has the interior through opening 156 formed through the shuttle cup body 186. In this version, as shown in FIG. 10B, the shuttle cup 46, such as the selected shuttle cup 46*a*, further has a counterbore opening portion 190 configured to support the counterbore fastener head 125*b* (see FIG. 2B) of the counterbore fastener 18*e* (see FIG. 2B). The fastener shank 130 (see FIG. 2B) and the tail end 136 (see FIG. 2B) of the counterbore fastener 18*e* (see FIG. 2B) are configured for insertion through a portion of the interior through opening 156. The length of the counterbore fastener 18*e* does not typically extend through the entire length of the interior through opening 156.

If fastener conductivity testing 12 is performed at the automated fastener shuttle assembly 44, the shuttle cup 46, such as the selected shuttle cup 46*a*, shown in either FIG. 10A or 10B, may integrate the eddy current conductivity probe assembly 82 having the eddy current conductivity probe 84 within interior portions of the shuttle cup 46, such as the selected shuttle cup 46*a*, as shown in FIGS. 5A and 5B.

The shuttle cups 46, such as the selected shuttle cups 46a, shown in FIGS. 10A-10B, may be made of a metal material 36 (see FIG. 1), such as steel 36d (see FIG. 1), stainless steel, aluminum 36b, or another suitable metal material. In addition, the shuttle cups 46, such as the selected shuttle cups 46a, shown in FIGS. 10A-10B, may have grooves (not shown) formed in the first end 185a, the second end 185b, or the shuttle cup body 186, configured to facilitate automated movement of the shuttle cups 46, such as the selected shuttle cups 46a, along tracks or rails, positioned between the automated fastener shuttle assembly 44 and the automated fastener inspection system 48. In addition, the shuttle cups 46, such as the selected shuttle cups 46a, shown in FIGS. 10A-10B, may have drive mechanisms, such as motors, or other mechanical or electrical drive or power elements coupled to the shuttle cups 46, such as the selected shuttle cups 46a, and configured to facilitate automated movement of the shuttle cups 46, such as the selected shuttle cups 46a, between the automated fastener shuttle assembly 44 and the automated fastener inspection system 48.

The shuttle cups 46, such as the selected shuttle cups 46a, shown in FIGS. 10A-10B, have a cylindrical shape 192 and are of a suitable size to hold and support fasteners 18 having different size diameters. However, in other versions, the shuttle cups 46 may be of other suitable shapes and sizes. In one version, the shuttle cups 46, such as the selected shuttle cups 46a, shown in FIGS. 10A-10B, preferably support the fastener 18 in the shuttle cup 46, such as the selected shuttle cup 46a, without mechanical restraints, to facilitate ease of movement of the fastener 18 in and out of the shuttle cup 46. However, in other versions, the shuttle cups 46, such as the selected shuttle cups 46a, it may be desired to restrain the fastener 18 in the shuttle cup 46, and the shuttle cups 46, such as the selected shuttle cups 46a, may include one or more mechanical restraints, such as one or more clamps, clips, clasps, or other suitable mechanical restraints, to restrain the fastener 18 in the shuttle cup 46.

Figure 11:
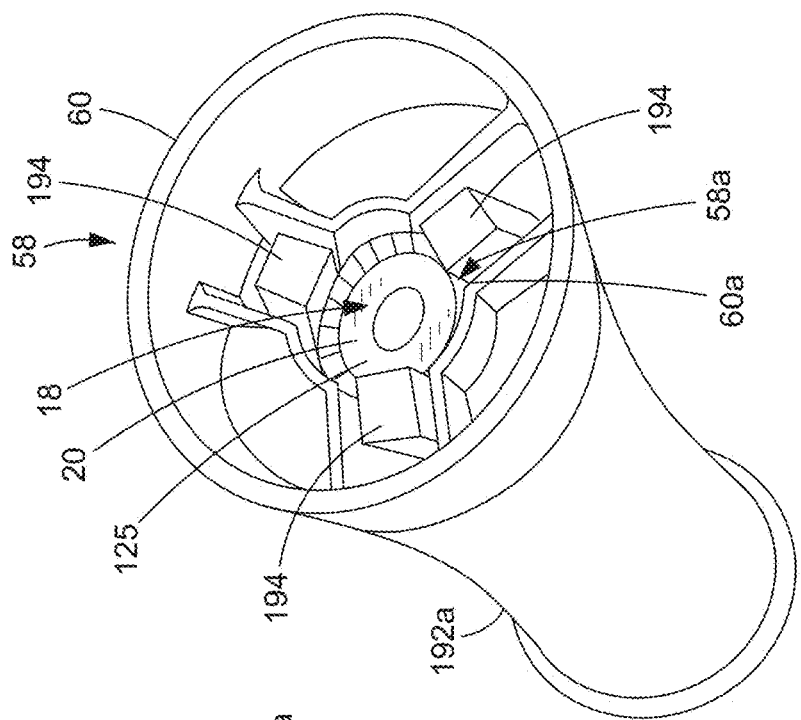
FIG. 11 is an illustration of a top front perspective view of an exemplary version of a delivery device of an automated delivery system used in a version of an automated fastener system and an automated method of the disclosure, showing a fastener retained within the delivery device.

Now referring to FIG. 11, FIG. 11 is an illustration of a top front perspective view of an exemplary version of a delivery device 58, such as a delivery shuttle 60, of the automated delivery system 56 (see FIG. 1) that may be used in a version of the automated fastener system 10 (see FIG. 1) and the automated method 250 (see FIG. 14) of the disclosure. FIG. 11 shows a fastener 18, such as an aircraft fastener 20, retained within a delivery device interior 58a of the delivery device 58, for example, a delivery shuttle interior 60a, of the delivery shuttle 60. The fastener 18 may comprise the selected fastener 18a (see FIG. 8) prior to the fastener conductivity testing 12 (see FIGS. 1, 8), or the fastener 18 may comprise the accepted fastener 18b (see FIG. 7) if accepted after the fastener conductivity testing 12 (see FIGS. 1, 7).

FIG. 11 further shows fastener retention elements 194 contacting the fastener head 125 of the fastener 18, to retain the fastener 18 in a position within the delivery device interior 58a, such as the delivery shuttle interior 60a. Alternatively, the fastener shank 130 (see FIGS. 2A-2B) and/or the tail end 136 (see FIGS. 2A-2B) of the fastener 18 may be retained, instead of the fastener head 125, or in addition to the fastener head 125, by fastener retention elements disposed in the delivery device interior 58a, such as the delivery shuttle interior 60a, past the fastener head 125. Preferably, the fastener 18 is encapsulated in the delivery device interior 58a, such as the delivery shuttle interior 60a. Preferably, the full length of the fastener 18 is encompassed within the delivery device interior 58a, such as the delivery shuttle interior 60a.

The fastener retention elements 194 may comprise clamps, clips, clasps, spring-loaded mechanisms, or other suitable fastener retention elements that retain or secure the fastener 18 within the delivery device interior 58a, such as the delivery shuttle interior 60a, during transport and delivery of the fastener 18 in the delivery device 58, such as the delivery shuttle 60, through the transfer tube 62 (see FIG. 1), such as the vacuum tube 62a (see FIG. 1) or the pressure tube 62b (see FIG. 1), disposed between the automated fastener inspection system 48 and the automated fastener installation system 64. The delivery device 58, such as the delivery shuttle 60, transports and delivers the fastener 18 away from the automated fastener inspection system 48 and to the automated fastener installation system 64 for installation in a structure 22 (see FIGS. 1, 15), such as an aircraft structure 24 (see FIGS. 1, 15).

The delivery device 58, such as a delivery shuttle 60, shown in FIG. 11, has a substantially cylindrical shape 192a and has a suitable size and shape to easily and efficiently travel through the transfer tube 62 (see FIG. 1), such as the vacuum tube 62a (see FIG. 1) or the pressure tube 62b (see FIG. 1). The delivery device 58, such as the delivery shuttle 60, shown in FIG. 11, may be made of a metal material 36 (see FIG. 1), such as steel 36d (see FIG. 1), stainless steel, aluminum 36b, or another suitable metal material.

The delivery device 58, such as the delivery shuttle 60, shown in FIG. 11, is an example of one version that may be used in the automated delivery system 56 (see FIG. 1) of the automated fastener system 10 (see FIG. 1) and the automated method 250 (see FIG. 14) of the disclosure. However, other versions of the delivery device 58, such as the delivery shuttle 60, with different parts or added parts, to achieve retention and delivery of the fastener 18 may be used.

Now referring to FIG. 12A, FIG. 12A is an illustration of a side perspective view of a version of the automated fastener installation system 64 (see also FIGS. 1, 6-8) that may be used in a version of the automated fastener system 10 (see FIG. 1) and the automated method 250 (see FIG. 14) of the disclosure, showing a version of the automated fastener installation system 64 in the form of a robotic system 72 having an end effector 66 coupled to the center shaft 49, such as the end effector center shaft 68. As shown in FIG. 12A, the end effector center shaft 68 has the eddy current conductivity probe assembly 82 and the eddy current conductivity probe 84 integrated in the end effector center shaft 68 and contacting the top end portion 126a of the top end 126 of the fastener head 125 of the fastener 18, such as the selected fastener 18a, for example, the aircraft fastener 20, such as the selected aircraft fastener 20a. The fastener 18 may also comprise another suitable fastener.

Figure 12B:
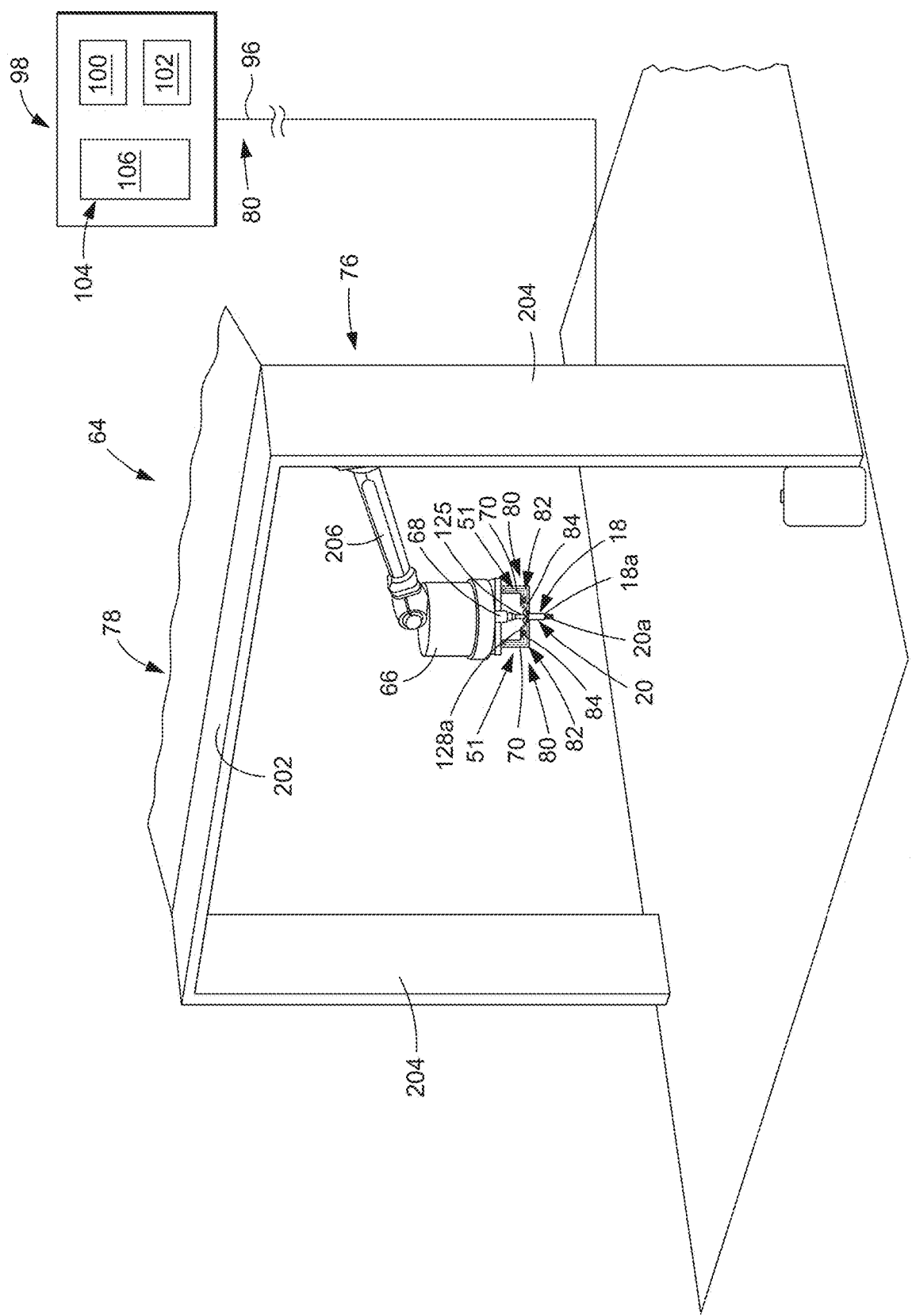
FIG. 12B is an illustration of a side perspective view of another version of an automated fastener installation system used in a version of an automated fastener system and an automated method of the disclosure, showing a gantry system having an end effector coupled to end effector gripper fingers with eddy current conductivity probe assemblies contacting a fastener.

In this version with the robotic system 72, after delivery of the selected fastener 18a to the automated fastener installation system 64, the selected fastener 18a undergoes fastener conductivity testing 12 (see FIG. 1) with the eddy current conductivity probe assembly 82 and the eddy current conductivity probe 84 integrated in the center shaft 49, such as the end effector center shaft 68. Alternatively, as shown in FIGS. 8, 12B, the eddy current conductivity probe assembly 82 and the eddy current conductivity probe 84 may be integrated in the end effector gripper fingers 70 coupled to the end effector 66, and contacting the side portions 128a of the fastener head 125 of the selected fastener 18a.

As further shown in FIG. 12A, the robotic system 72 comprises the end effector 66 attached to a robot 74. As further shown in FIG. 12A, in one version, the robot 74 comprises a robot arm 195 connected to an elbow joint 196, the elbow joint 196 connected to a shoulder 198, and the shoulder 198 connected to a base assembly 200.

As further shown in FIG. 12A, the automated eddy current conductivity probe system 80 coupled to the end effector 66 and the robotic system 72 is coupled to the processing system 98 via the data connection 96, which may comprise the wired data connection 96a (see FIG. 1) or the wireless data connection 96b (see FIG. 1). As shown in FIG. 12A, the processing system 98 comprises at least the control system 100, one or more power supplies 102, and the computer system 104 with the computer 106.

In this version, as shown in 12A, the eddy current conductivity probe assembly 82 with the eddy current conductivity probe 84 contacts the selected fastener 18a to perform the fastener conductivity testing 12, and to obtain the electrical conductivity measurement 14 (see FIG. 1) of the selected fastener 18a. The electrical conductivity measurement 14 is sent, via the data connection 96, to the processing system 98, where the electrical conductivity measurement 14 is processed. The control logic 112 (see FIG. 1) implemented by the computer software program 110 (see FIG. 1) of the processing system 98 compares the electrical conductivity measurement 14 of the selected fastener 18a against the predetermined electrical conductivity value range 114 (see FIG. 1) of the predetermined fastener material 115 (see FIG. 1), to obtain the fastener material determination 116 (see FIG. 1) of the selected fastener 18a, and to accept or to reject the selected fastener 18a based on the fastener material determination 116.

Now referring to FIG. 12B, FIG. 12B is an illustration of a side perspective view of another version of the automated fastener installation system 64 that may be used in a version of the automated fastener system 10 (see FIG. 1) and the automated method 250 (see FIG. 14) of the disclosure, showing a version of the automated fastener installation system 64 in the form of a gantry system 76 with a gantry 78 and with an end effector 66 coupled to the gantry 78. As shown in FIG. 12B, the end effector 66 is also coupled to the gripper fingers 51, such as end effector gripper fingers 70. Each end effector gripper finger 70 has the eddy current conductivity probe assembly 82 and the eddy current conductivity probe 84 integrated within the end effector gripper finger 70 and contacting the side portion 128a of the side 128 of the fastener head 125 of the fastener 18, such as the selected fastener 18a, for example, the aircraft fastener 20, such as the selected aircraft fastener 20a. The fastener 18 may also comprise another suitable fastener.

As shown in FIG. 12B, and also shown and discussed above with regard to FIG. 8, in this version, after delivery of the selected fastener 18a to the automated fastener installation system 64, the selected fastener 18a undergoes fastener conductivity testing 12 (see FIG. 1) with the eddy current conductivity probe assembly 82 and the eddy current conductivity probe 84 integrated in the end effector gripper fingers 70 (see also FIG. 12A) coupled to the end effector 66, and contacting the side portions 128a of the fastener head 125 of the selected fastener 18a. Alternatively, as shown in FIG. 12A, the eddy current conductivity probe assembly 82 and the eddy current conductivity probe 84 may be integrated in the center shaft 49, such as the end effector center shaft 68, coupled to the end effector 66, and contacting the top end portion 126a of the fastener head 125 of the selected fastener 18a.

As further shown in FIG. 12B, the gantry 78 comprises a horizontal beam 202 spanning between two support legs 204. As shown in FIG. 12B, the gantry system 76 further comprises an arm portion 206 attached to the end effector 66 at one end and attached to a support leg 204 at the other end. The gantry system 76 may further comprise one or more other components known to one skilled in the art, including but not limited to, a trolley, a crane, one or more carriages, a controller, and other suitable components.

As further shown in FIG. 12B, the automated eddy current conductivity probe system 80 coupled to the end effector 66 and the gantry system 76 is coupled to the processing system 98 via the data connection 96, which may comprise the wired data connection 96a (see FIG. 1) or the wireless data connection 96b (see FIG. 1). As shown in FIG. 12B, the processing system 98 comprises at least the control system 100, one or more power supplies 102, and the computer system 104 with the computer 106.

In this version, as shown in 12B, the eddy current conductivity probe assembly 82 with the eddy current conductivity probe 84 contacts the selected fastener 18a to perform the fastener conductivity testing 12, and to obtain the electrical conductivity measurement 14 (see FIG. 1) of the selected fastener 18a. The electrical conductivity measurement 14 is sent, via the data connection 96, to the processing system 98, where the electrical conductivity measurement 14 is processed. The control logic 112 (see FIG. 1) implemented by the computer software program 110 (see FIG. 1) of the processing system 98 compares the electrical conductivity measurement 14 of the selected fastener 18a against the predetermined electrical conductivity value range 114 (see FIG. 1) of the predetermined fastener material 115 (see FIG. 1), to obtain the fastener material determination 116 (see FIG. 1) of the selected fastener 18a, and to accept or to reject the selected fastener 18a based on the fastener material determination 116.

Figure 13:
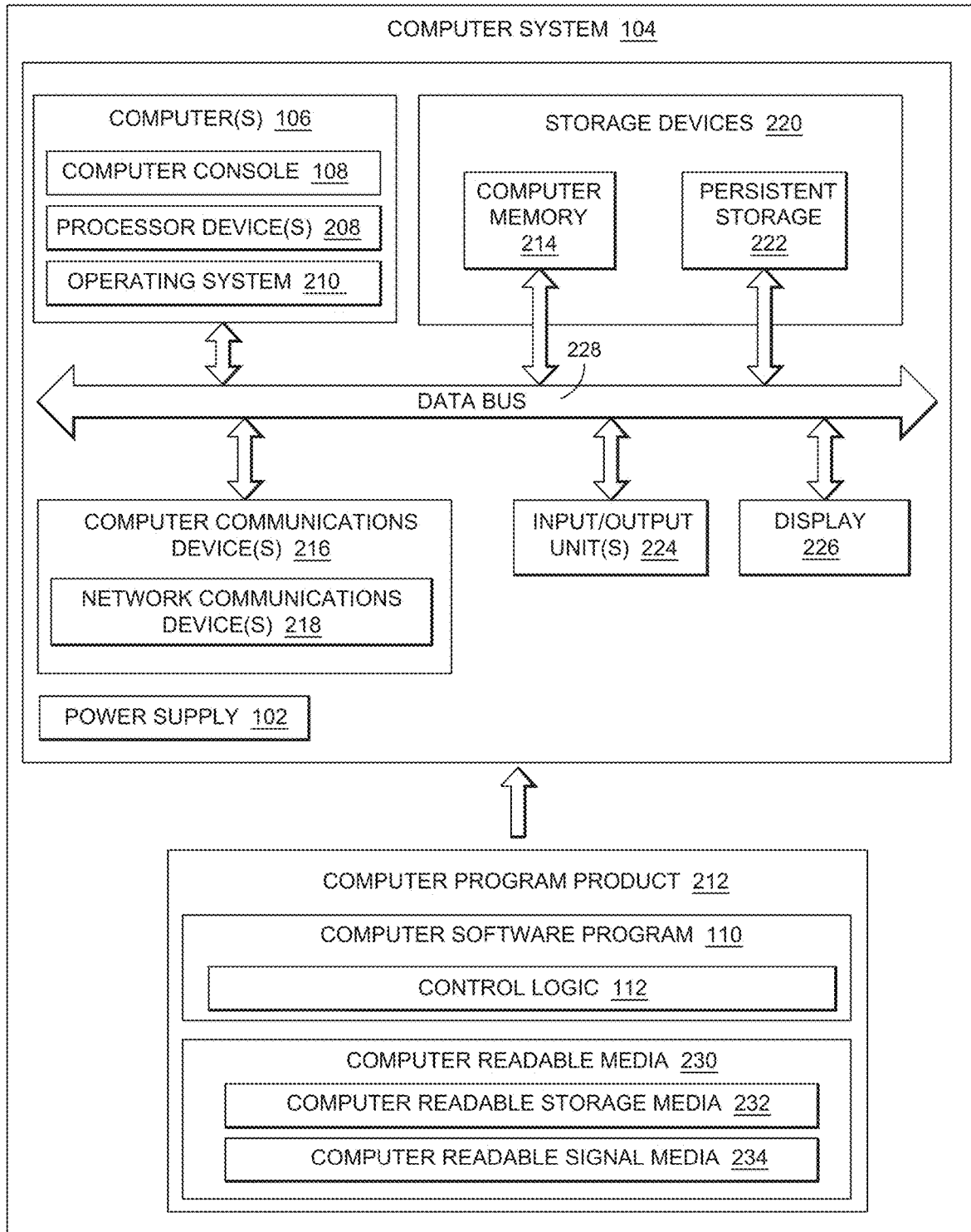
FIG. 13 is an illustration of a block diagram of an exemplary version of a computer system of a processing system used in a version of an automated fastener system and an automated method of the disclosure.

Now referring to FIG. 13, FIG. 13 is an illustration of a block diagram of an exemplary version of the computer system 104 that may be used with versions of the automated fastener system 10 (see FIG. 1) and the automated method 250 (see FIG. 14) of the disclosure. As shown in FIG. 13, the computer system 104 comprises one or more computers 106 with one or more processor devices 208, and an operating system 210. The computer system 104 (see FIG. 13) may be used to implement the one or more computers 106 (see FIG. 13).

The one or more computers 106 (see FIG. 13) or one or more processor devices 208 (see FIG. 13) may be configured to control one or more functions of one or more elements of the automated fastener system 10 (see FIG. 1) through computer program instructions, such as a computer program product 212 (see FIG. 13) stored on a computer memory 214 (see FIG. 13), accessible to the one or more computers 106 (see FIG. 13), or one or more processor devices 208 (see FIG. 13).

As shown in FIG. 13, the computer system 104 may further comprise one or more computer communications devices 216, such as networking communications devices 218, for linking the automated fastener system 10 (see FIG. 1), for example, to one or more separate systems. The networking communications devices 218 (see FIG. 13) may comprise network links between various computers and devices connected together within a network data processing system via wire connections, wireless communication links, fiber optic cables, or other suitable network connections, and that may connect to a network, a server, the Internet, or another system or device.

The one or more computer communications devices 216 (see FIG. 13) may be configured to provide for communications in accordance with any of a number of wired or wireless communication standards. The one or more computers 106 (see FIG. 13) or one or more processor devices 208 (see FIG. 13) may also be configured to facilitate communications via the one or more computer communications devices 216 (see FIG. 13) by, for example, controlling hardware included within the one or more computer communications devices 216 (see FIG. 13). The one or more computer communications devices 216 (see FIG. 13) may include, for example, one or more antennas, a transmitter, a receiver, a transceiver and/or supporting hardware, including, for example, a processor for enabling communications.

As shown in FIG. 13, the computer system 104 further comprises storage devices 220, such as computer memory 214 and persistent storage 222. The computer memory 214 (see FIG. 13) may comprise one or more of a random access memory (RAM), including dynamic and/or static RAM, on-chip or off-chip cache memory, or other suitable computer memory. The persistent storage 222 (see FIG. 13) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage.

As shown in FIG. 13, the computer system 104 further comprises one or more input/output units 224, a display 226, a data bus 228, and a power supply 102. The one or more input/output units 224 (see FIG. 13) provide for the input and output of data with other devices connected to the computer system 104 (see FIG. 13), such as, the computer interfaces. The one or more input/output units 224 (see FIG. 13) may comprise such devices as a keyboard, a mouse, a joystick, or other input/output devices. For example, the one or more input/output units 224 (see FIG. 13) may provide a connection for user input though a keyboard and mouse, or may send output to a printer or other device.

The display 226 (see FIG. 13) provides the means to display the electrical conductivity measurement 14 (see FIG. 1) of the fastener 18 (see FIG. 1), such as the selected fastener 18*a* (see FIG. 1), or other data or information to an operator, a user, an analyst, one or more separate automated systems, automated computer programs, automated apparatuses, or automated devices, or another suitable separate system, program, or device. As shown in FIG. 13, the data bus 228 provides communications between the one or more computers 106, the computer memory 214, the persistent storage 222, the computer communications devices 216, the one or more input/output units 224, and the display 226. The power supply 102 (see FIG. 13) of the computer system 104 (see FIG. 13) may comprise batteries, electricity, solar chargers, or other power supply elements.

As shown in FIG. 13, the computer program product 212 is preferably used in the computer system 104. The computer program product 212 (see FIG. 13) comprises the computer software program 110 (see FIG. 13) with the control logic 112 (see FIG. 13). The control logic 112 may comprise an algorithm, program code, computer firmware, or another suitable system logic. As shown in FIG. 13, the computer program product 212 may comprise a computer readable medium 230. The computer readable medium 230 (see FIG. 13) may comprise computer readable storage media 232 (see FIG. 13), computer readable signal media 234 (see FIG. 13), or another suitable computer readable medium.

The control logic 112 (see FIG. 13) may be stored in and retrieved from the computer readable storage media 232 (see FIG. 13) and loaded into the one or more computers 106 (see FIG. 13), the one or more processor devices 208, or other programmable device, to configure and direct the one or more computers 106, the one or more processor devices 208, or other programmable device to execute operations to be performed on or by the one or more computers 106, the one or more processor devices 208, or other programmable device, and to function in a particular way. Execution of the control logic 112 (see FIG. 13) implemented by the computer software program 110 may produce a computer-implemented system, process or method, such that the control logic 112 executed by the one or more computers 106 (see FIG. 13), the one or more processor devices 208 (see FIG. 13), or other programmable device provide operations for implementing the functions disclosed herein.

Figure 14:
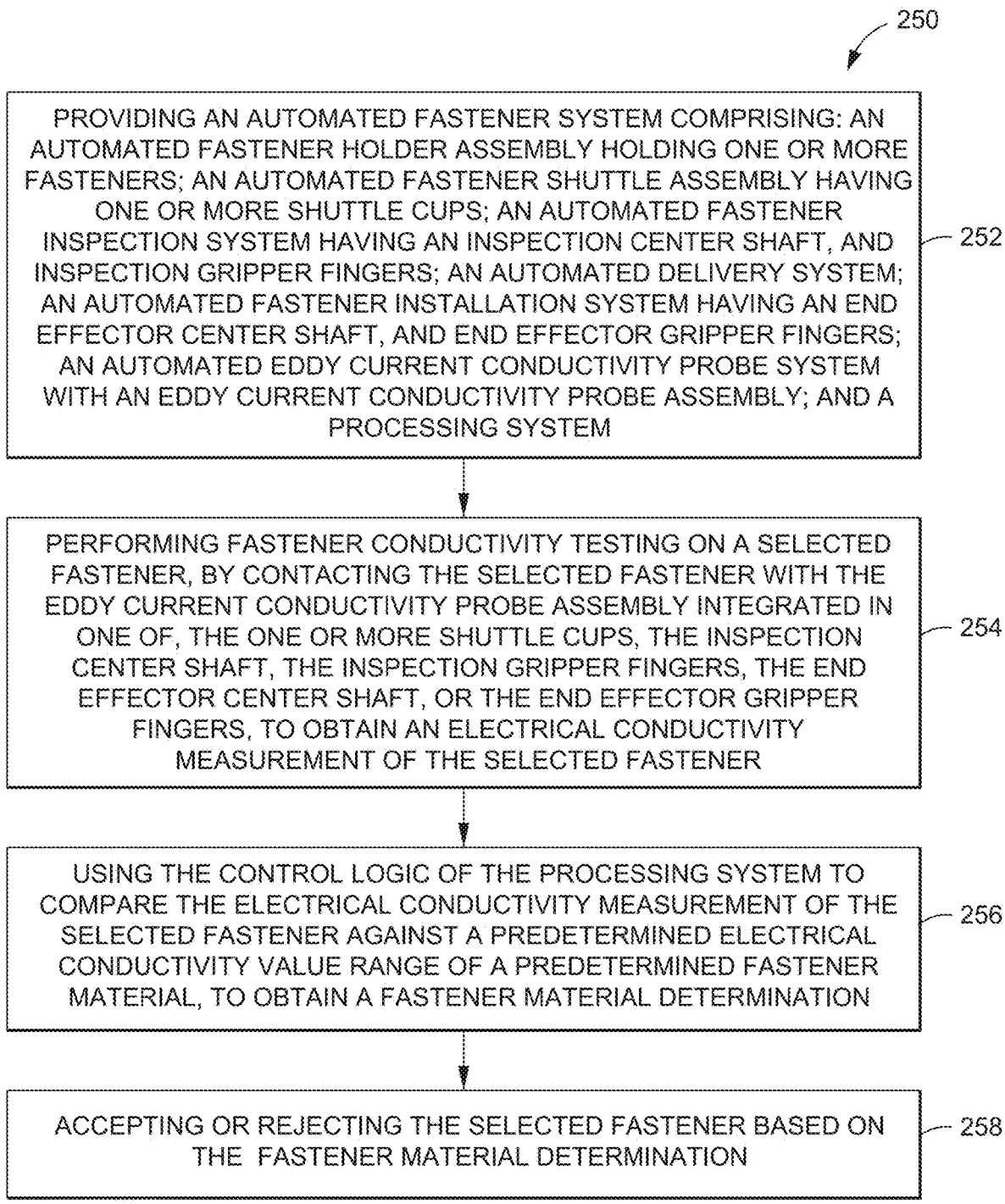
FIG. 14 is an illustration of a flow diagram of an exemplary version of an automated method of the disclosure.

Now referring to FIG. 14, FIG. 14 is an illustration of a flow diagram of an exemplary version of an automated method 250 of the disclosure. In another version of the disclosure, there is provided the automated method 250 of performing fastener conductivity testing 12 (see FIG. 1) in an automated fastener system 10 (see FIG. 1). The blocks in FIG. 14 represent operations and/or portions thereof, or elements, and lines connecting the various blocks do not imply any particular order or dependency of the operations or portions thereof, or elements. FIG. 14 and the disclosure of the steps of the automated method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 14, the automated method 250 comprises providing 252 the automated fastener system 10. As discussed in detail above, the automated fastener system 10 comprises the automated fastener holder assembly 40 (see FIG. 1) holding and dispensing one or more fasteners 18 (see FIG. 1), such as one or more aircraft fasteners 20 (see FIG. 1).

The automated fastener system 10 further comprises the automated fastener shuttle assembly 44 (see FIG. 1) having one or more shuttle cups 46 (see FIGS. 1, 10A-10B). A selected shuttle cup 46*a* (see FIGS. 1, 6) of the one or more shuttle cups 46 is configured to receive, and receives, a selected fastener 18*a* (see FIGS. 1, 6) of the one or more fasteners 18, such as a selected aircraft fastener 20*a* (see FIG. 1) of the one or more aircraft fasteners 20, from the automated fastener holder assembly 40, and the selected shuttle cup 46*a* transports the selected fastener 18*a*. such as the selected aircraft fastener 20*a*, in the selected shuttle cup 46*a*.

The automated fastener system 10 further comprises the automated fastener inspection system 48 (see FIGS. 1, 9) having the inspection center shaft 50 (see FIGS. 1, 9), and two or more inspection gripper fingers 52 (see FIGS. 1, 9) configured to pick up, to grip and to inspect, and to release the selected fastener 18*a*, such as the selected aircraft fastener 20*a*.

The automated fastener system 10 further comprises the automated delivery system 56 (see FIG. 1) having the delivery device 58 (see FIGS. 1, 11), such as delivery shuttle 60 (see FIG. 11), configured to transport the selected fastener 18*a*, such as the selected aircraft fastener 20*a*, away from the automated fastener inspection system 48.

The automated fastener system 10 further comprises the automated fastener installation system 64 (see FIGS. 1, 12A-12B) having the end effector 66 (see FIGS. 1, 12A-12B) with the end effector center shaft 68 (see FIGS. 1, 12A), and two or more end effector gripper fingers 70 (see FIGS. 1, 12B) configured to pick up the selected fastener 18a, such as the selected aircraft fastener 20a, from the delivery device 58 transported by the automated delivery system 56, and configured to install the selected fastener 18a, such as the selected aircraft fastener 20a, in a structure 22 (see FIGS. 1, 15), such as an aircraft structure 24 (see FIGS. 1, 15).

The automated fastener system 10 further comprises the automated eddy current conductivity probe system 80 (see FIG. 1) comprising the eddy current conductivity probe assembly 82 (see FIGS. 1, 3A-5B) integrated in one of, the one or more shuttle cups 46 (see FIGS. 1, 5A-5B), the inspection center shaft 50 (see FIGS. 1, 4A), the two or more inspection gripper fingers 52 (see FIGS. 1, 4B), the end effector center shaft 68 (see FIGS. 1, 12A), or the two or more end effector gripper fingers 70 (see FIGS. 1, 12B).

The automated fastener system 10 further comprises the processing system 98 (see FIGS. 1, 4A-5B) comprising the computer system 104 (see FIGS. 1, 13) with the computer 106 (see FIGS. 1, 6-8, 13) having the computer console 108 (see FIGS. 1, 6-8, 13), and the computer software program 110 (see FIGS. 1, 13) implementing the control logic 112 (see FIGS. 1, 13).

The step of providing 252 the automated fastener system 10 may further comprise, providing the automated fastener system 10 (see FIG. 1) where the automated eddy current conductivity probe system 80 (see FIG. 1) comprises the eddy current conductivity probe assembly 82 (see FIG. 1) comprising one or more eddy current conductivity probes 84 (see FIG. 1) with one or more coils 86 (see FIGS. 1, 3A-5B) coupled to electrical wires 88 (see FIGS. 1, 3B). The eddy current conductivity probe assembly 82 (see FIG. 1) further comprises the sensor 90 (see FIGS. 1, 3A-3D, 5A-5B) in the control box 92 (see FIGS. 1, 3A-3D, 5A-5B). The sensor 90 is preferably coupled to the one or more eddy current conductivity probes 84, via the electrical wires 88.

The automated eddy current conductivity probe system 80 (see FIG. 1) further comprises the data connection 96 (see FIG. 1) to transmit the electrical conductivity measurement 14 (see FIG. 1) to the computer 106 (see FIGS. 1, 6-8, 13). The data connection 96 comprises the wired data connection 96a (see FIG. 1), or the wireless data connection 96b (see FIG. 1).

Providing 252 the automated fastener system 10 may further comprise, providing the automated fastener system 10 (see FIG. 1) with the automated fastener installation system 64 (see FIGS. 1, 12A-12B) further comprising the end effector 66 (see FIGS. 1, 12A-12B) coupled to one of, the robotic system 72 (see FIG. 12A) with the robot 74 (see FIG. 12A), or the gantry system 76 (see FIG. 12B) with the gantry 78 (see FIG. 12B).

As shown in FIG. 14, the automated method 250 further comprises performing 254 the fastener conductivity testing 12 on the selected fastener 18a, such as the selected aircraft fastener 20a, by contacting the selected fastener 18a, such as the selected aircraft fastener 20a, with the eddy current conductivity probe assembly 82 integrated in one of, the one or more shuttle cups 46 (see FIGS. 5A-5B, 10A-10B), the inspection center shaft 50 (see FIGS. 1, 4A), the two or more inspection gripper fingers 52 (see FIGS. 1, 4B), the end effector center shaft 68 (see FIGS. 1, 12A), or the two or more end effector gripper fingers 70 (see FIGS. 1, 12B), to obtain the electrical conductivity measurement 14 (see FIG. 1) of the selected fastener 18a, such as the selected aircraft fastener 20a.

Performing 254 the fastener conductivity testing 12 on the selected fastener 18a, such as the selected aircraft fastener 20a, may further comprise, performing the fastener conductivity testing 12 on the selected fastener 18a, such as the selected aircraft fastener 20a, where the eddy current conductivity probe assembly 82 integrated in the one or more shuttle cups 46, comprises, one or more eddy current conductivity probes 84. Each of the one or more eddy current conductivity probes 84 has one or more coils 86 (see FIGS. 1, 5A-5B) coupled to electrical wires 88 (see FIGS. 1, 5A). The one or more eddy current conductivity probes 84 are configured to contact, and contact, one of, one or more side portions 128a (see FIG. 5A) of the fastener head 125 (see FIG. 5A) of the selected fastener 18a (see FIG. 5A), such as the selected aircraft fastener 20a, in the selected shuttle cup 46a (see FIG. 5A) of the one or more shuttle cups 46 (see FIGS. 1, 5A), or one or more shank side portions 131a (see FIG. 5B) of the fastener shank 130 (see FIG. 5B) of the selected fastener 18a (see FIG. 5B), such as the selected aircraft fastener 20a (see FIG. 5B), in the selected shuttle cup 46a (see FIG. 5B).

The eddy current conductivity probe assembly 82 may further comprise the actuator 94 (see FIGS. 5A-5B) coupled to each of the one or more eddy current conductivity probes 84, to move the one or more eddy current conductivity probes 84 against the selected fastener 18a, such as the selected aircraft fastener 20a, when needed, to contact the selected fastener 18a, such as the selected aircraft fastener 20a, to perform the fastener conductivity testing 12. The eddy current conductivity probe assembly 82 further comprises the sensor 90 (see FIGS. 5A-5B) in the control box 92 (see FIG. 5A-5B). The sensor 90 is coupled to the one or more eddy current conductivity probes 84, via the electrical wires 88.

Performing 254 the fastener conductivity testing 12 on the selected fastener 18a, such as the selected aircraft fastener 20a, may further comprise, performing the fastener conductivity testing 12 on the selected fastener 18a, such as the selected aircraft fastener 20a, where the eddy current conductivity probe assembly 82 integrated in either, the two or more inspection gripper fingers 52 (see FIG. 4B), or the two or more end effector gripper fingers 70 (see FIG. 12B), comprises, the eddy current conductivity probe 84, in each inspection gripper finger 52, or in each end effector gripper finger 70. Each eddy current conductivity probe 84 has one or more coils 86 (see FIGS. 4B, 12B) coupled to electrical wires 88 (see FIG. 4B). The eddy current conductivity probe 84 is configured to contact, and contacts, one or more side portions 128a (see FIG. 4B) of the fastener head 125 (see FIG. 4B) of the selected fastener 18a (see FIG. 4B), such as the selected aircraft fastener 20a. The eddy current conductivity probe assembly 82 further comprises the sensor 90 (see FIG. 1) in the control box 92 (see FIG. 1). The sensor 90 is coupled to the one or more eddy current conductivity probes 84, via the electrical wires 88.

Performing 254 the fastener conductivity testing 12 on the selected fastener 18a, such as the selected aircraft fastener 20a, may further comprise, performing the fastener conductivity testing 12 on the selected fastener 18a, such as the selected aircraft fastener 20a, where the eddy current conductivity probe assembly 82 integrated in either, the inspection center shaft 50 (see FIGS. 1, 4A), or the end effector center shaft 68 (see FIGS. 1, 12A), comprises, the eddy current conductivity probe 84 having one or more coils 86 (see FIGS. 4A, 12A) coupled to electrical wires 88 (see FIG. 4A). The eddy current conductivity probe 84 is configured to contact, and contacts, one or more top end portions 126a (see FIGS. 4A, 12A) of the fastener head 125 (see FIG. 4A) of the selected fastener 18a (see FIG. 4A), such as the selected aircraft fastener 20a. The eddy current conductivity probe assembly 82 further comprises the sensor 90 (see FIG. 1) in the control box 92 (see FIG. 1). The sensor 90 is coupled to the one or more eddy current conductivity probes 84, via the electrical wires 88.

As shown in FIG. 14, the automated method 250 further comprises using 256 the control logic 112 (see FIGS. 1, 13) of the processing system 98 (see FIG. 1) to compare the electrical conductivity measurement 14 (see FIG. 1) of the selected fastener 18a, such as the selected aircraft fastener 20a, against the predetermined electrical conductivity value range 114 (see FIG. 1) of the predetermined fastener material 115 (see FIG. 1), to obtain the fastener material determination 116 (see FIG. 1) of the selected fastener 18a, such as the selected aircraft fastener 20a. As shown in FIG. 1, the control logic 112 implemented by the computer software program 110 uses the electrical conductivity measurement 14 of the selected fastener 18a, such as the selected aircraft fastener 20a, to compare against a predetermined electrical conductivity value range 114 of a predetermined fastener material 115, to obtain a fastener material determination 116 of the selected fastener 18a, such as the selected aircraft fastener 20a. The control logic 112 compares the electrical conductivity measurement 14 to the predetermined electrical conductivity value range 114 of the predetermined fastener material 115 to obtain the fastener material determination 116, which is based on the difference in value between the electrical conductivity measurement 14 that is actually measured and the predetermined electrical conductivity value range 114.

As shown in FIG. 14, the automated method 250 further comprises accepting or rejecting 258 the selected fastener 18a, such as the selected aircraft fastener 20a, based on the fastener material determination 116. Based on the fastener material determination 116 of a pass or a fail, an automated command 118 (see FIG. 1) is sent, and if it is a pass, the selected fastener 18a, such as the selected aircraft fastener 20a, is accepted to obtain a fastener acceptance 120 of the accepted fastener 18b, or if it is a fail, the selected fastener 18a, such as the selected aircraft fastener 20a, is rejected to obtain a fastener rejection 122 of the rejected fastener 18c.

Now referring to FIG. 15, FIG. 15 is an illustration of a perspective view of a vehicle 280, such as an aircraft 280a, that incorporates one or more structures 22, such as one or more aircraft structures 24, having fasteners 18 (see FIGS. 1, 2A-2B), such as aircraft fasteners 20 (see FIG. 1), of a type that can undergo fastener conductivity testing 12 with versions of the automated fastener system 10 (see FIG. 1) and the automated method 250 (see FIG. 14) of the disclosure, for example, prior to installation and assembly. As shown in FIG. 15, the vehicle 280, such as the aircraft 280a, comprises the fuselage 282, wings 284, engines 286, and the tail 288. As shown in FIG. 15, the tail 288 comprises a vertical stabilizer 290 and horizontal stabilizers 292. The one or more structures 22, such as the one or more aircraft structures 24, may comprise wing panels or other panels of composite structures, such as carbon fiber reinforced plastic (CFRP) structures or another type of composite structure, may comprise metal structures, such as aluminum, steel, or another type of metal structure, or may comprise a combination of composite and metal structures.

Although the aircraft 280a shown in FIG. 15 is generally representative of a commercial passenger aircraft having one or more aircraft structures 24, the teachings of the disclosed versions of the automated fastener system 10 and the automated method 250 may be applied to fasteners 18, such as aircraft fasteners 20, joining structures 22 for other passenger aircraft. Moreover, the teachings of the disclosed versions of the automated fastener system 10 and the automated method 250 may be applied to fasteners 18 joining structures 22 for cargo aircraft, military aircraft, rotorcraft, and other types of aircraft or aerial vehicles, as well as aerospace vehicles, spacecraft, satellites, space launch vehicles, rockets, and other aerospace vehicles. Further, the teachings of the disclosed versions of the automated fastener system 10 and the automated method 250 may be applied to fasteners 18 joining structures 22 for may be applied to watercraft, automobiles, trains, architectural structures, or other suitable vehicles or structures.

Figure 16:
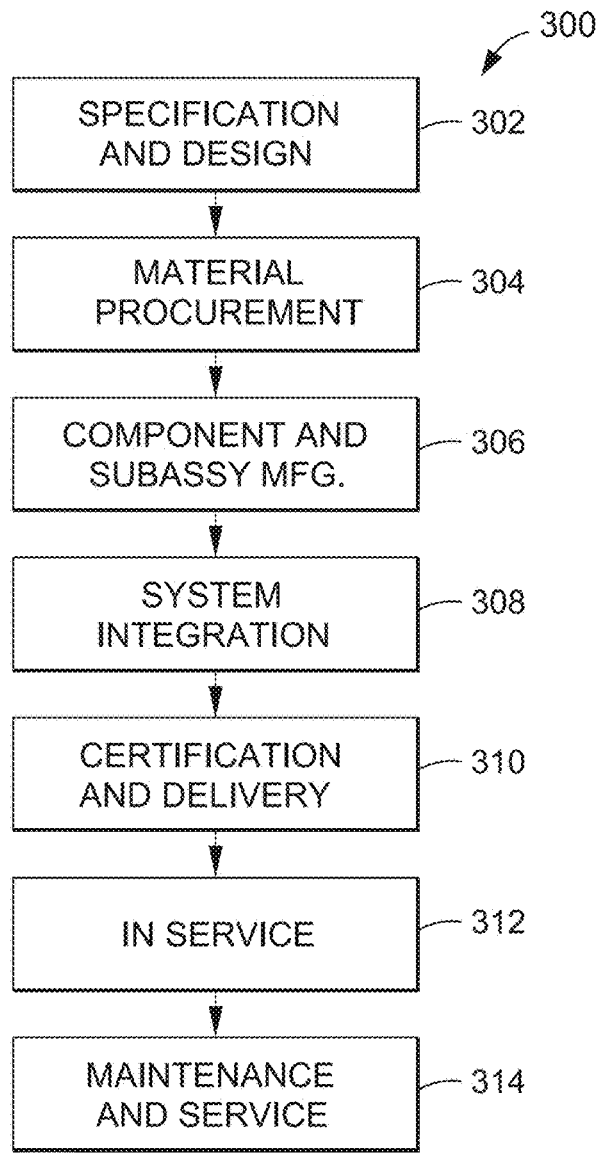
FIG. 16 is an illustration of a flow diagram of an exemplary aircraft manufacturing and service method.
Figure 17:
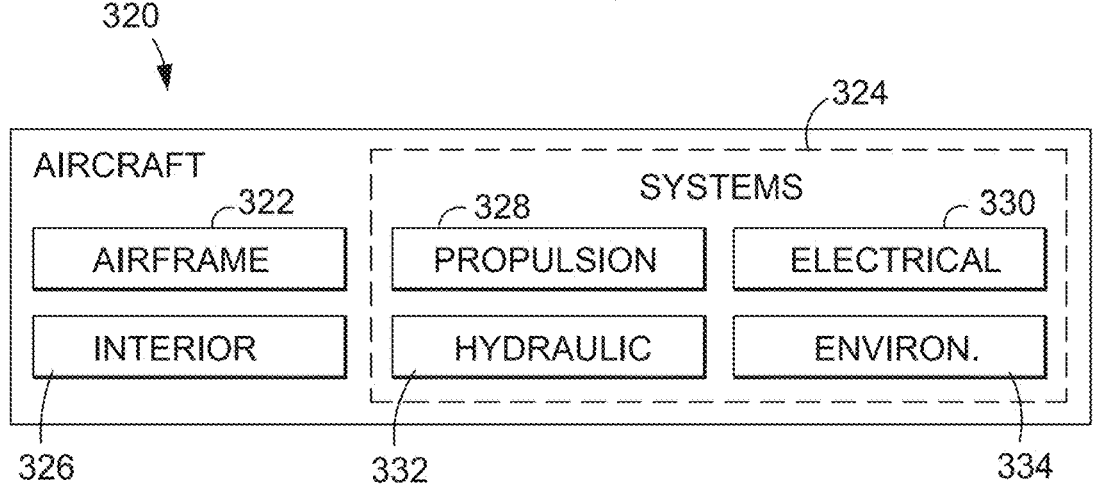
FIG. 17 is an illustration of an exemplary block diagram of an aircraft.

Now referring to FIGS. 16 and 17, FIG. 16 is an illustration of a flow diagram of an exemplary aircraft manufacturing and service method 300, and FIG. 17 is an illustration of an exemplary block diagram of an aircraft 316. Referring to FIGS. 16 and 17, versions of the disclosure may be described in the context of the aircraft manufacturing and service method 300 as shown in FIG. 16, and the aircraft 316 as shown in FIG. 17.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 17, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the automated fastener system 10 (see FIG. 1) and the automated method 250 (see FIG. 14) provide for fastener conductivity testing 12 (see FIG. 1) of fasteners 18 (see FIG. 1), such as aircraft fasteners 20 (see FIG. 1), in an automated fastener system 10 setting to detect different base fastener materials 34 of the fasteners 18 in order to prevent an incorrect fastener 18 from being installed in the automated fastener system 10.

The automated fastener system 10 and the automated method 250 use the automated eddy current conductivity probe system 80 (see FIG. 1) comprising the eddy current conductivity probe assembly 82 (see FIG. 1) and the eddy current conductivity probe 84 (see FIG. 1) integrated in one of, the one or more shuttle cups 46 (see FIGS. 5A-5B), the inspection center shaft 50 (see FIG. 4A), the two or more inspection gripper fingers 52 (see FIG. 4B), the end effector center shaft 68 (see FIG. 12A), or the two or more end effector gripper fingers 70 (see FIG. 12B). The eddy current conductivity probe assembly 82 and the eddy current conductivity probe 84 contact the selected fastener 18a to perform the fastener conductivity testing 12, and to obtain the electrical conductivity measurement 14 (see FIG. 1) of the selected fastener 18a. The automated fastener system 10 and the automated method 250 having the fastener conductivity testing 12 ensures that the correct fastener 18 of the correct base fastener material 34 (see FIG. 1) is installed in the structure 22 (see FIGS. 1, 15), such as the aircraft structure 24 (see FIGS. 1, 15). The improved automated fastener system 10 and the automated method 250 having the fastener conductivity testing 12 of the fasteners 18 integrates the eddy current conductivity probe assembly 82 and the eddy current conductivity probe 84 one or more points in the automated fastener system 10, measures the electrical conductivity 16 (see FIG. 1), and uses the processing system 98 (see FIG. 1) with the control logic 112 (see FIG. 1) to compare the electrical conductivity measurement 14 (see FIG. 1) against the predetermined electrical conductivity value range 114 (see FIG. 1), to obtain the fastener material determination 116 (see FIG. 1) of the base fastener material 34 of the fastener 18. The control logic 112 implemented by the computer software program 110 identifies whether or not the electrical conductivity measurements 14 are within the correct predetermined electrical conductivity value range 114 for the correct base fastener material 34. The automated fastener system 10 and the automated method 250 are reliable, and do not damage the fastener 18 during the fastener conductivity testing 12.

In addition, disclosed versions of the automated fastener system 10 (see FIG. 1) and the automated method 250 (see FIG. 14) may be used with a robotic system 72 (see FIG. 12A) with a robot 74 (see FIG. 12A), or may be used with a gantry system 76 (see FIG. 12B) with a gantry 78 (see FIG. 12B). The automated fastener system 10 automatically performs the fastener conductivity testing 12 of the fastener 18 and identifies the type of base fastener material 34, such as a metal material 36 (see FIG. 1) or a metal alloy material 38 (see FIG. 1) the fastener 18 is made out of. The automated fastener system 10 and the automated method 250 then accepts or rejects the fastener 18 based on whether or not the fastener 18 is made from the correct base fastener material 34. If the fastener 18 is the correct base fastener material 34, the fastener 18 will continue through the process for installation in the structure 22 (see FIG. 1), such as the aircraft structure 24 (see FIG. 1). If the fastener 18 is determined to be an incorrect base fastener material 34, the fastener 18 is rejected and discarded in the fastener rejection container 124 (see FIGS. 6-8), and the machine operator or user may be automatically notified of the fastener rejection 122 of the rejected fastener 18c (see FIGS. 6-8). The automated fastener system 10 continues the flow process 165 by pulling a second fastener 18 and performing its inspections as normal. If multiple fastener rejections 122 (see FIGS. 6-8) occur, the fastener 18 lot may be suspect and may need to be investigated. The automated fastener system 10 notifies a machine operator or a user of the multiple fastener rejections 122 and the process flow 165 may cease in order to investigate the rejected fasteners 18c.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An automated fastener system having fastener conductivity testing, the automated fastener system comprising:
an automated fastener holder assembly holding and dispensing one or more fasteners, wherein each of the one or more fasteners is made of a base fastener material comprising, a metal material, including titanium, aluminum, nickel, steel, copper, silver, or zinc; or a metal alloy material, including a nickel-chromium alloy, brass, bronze, a titanium alloy, an aluminum alloy, a nickel alloy, a steel alloy, a copper alloy, a silver alloy, or a zinc alloy;
an automated fastener shuttle assembly having one or more shuttle cups, wherein a selected shuttle cup receives a selected fastener from the automated fastener holder assembly, and transports the selected fastener in the selected shuttle cup;
an automated fastener inspection system having an inspection center shaft, and two or more inspection gripper fingers configured to pick up, to inspect, and to release the selected fastener;
an automated delivery system having a delivery device configured to transport the selected fastener;
an automated fastener installation system having an end effector with an end effector center shaft, and two or more end effector gripper fingers configured to pick up the selected fastener from the delivery device transported by the automated delivery system, and configured to install the selected fastener in a structure;
an automated eddy current conductivity probe system comprising an eddy current conductivity probe assembly integrated in one of, the one or more shuttle cups, the inspection center shaft, the two or more inspection gripper fingers, the end effector center shaft, or the two or more end effector gripper fingers, the eddy current conductivity probe assembly contacting the selected fastener to perform the fastener conductivity testing, and to obtain an electrical conductivity measurement of the selected fastener; and
a processing system to process the electrical conductivity measurement of the selected fastener, the processing system comprising a computer system with a computer having a computer console, and a computer software program implementing a control logic,
wherein the control logic implemented by the computer software program compares the electrical conductivity measurement of the selected fastener against a predetermined electrical conductivity value range of a predetermined fastener material, to obtain a fastener material determination of the selected fastener, and to accept, or to reject, the selected fastener based on the fastener material determination.

2. The automated fastener system of claim 1, wherein the automated eddy current conductivity probe system comprises:
the eddy current conductivity probe assembly comprising:
one or more eddy current conductivity probes, each with one or more coils coupled to electrical wires; and
a sensor in a control box, the sensor coupled to the one or more eddy current conductivity probes via the electrical wires; and
a data connection to transmit the electrical conductivity measurement to the computer, the data connection comprising one of, a wired data connection, or a wireless data connection.

3. The automated fastener system of claim 2, wherein the one or more eddy current conductivity probes of the eddy current conductivity probe assembly contact the selected fastener at one or more fastener portions comprising:
one or more top end portions of a fastener head of the selected fastener;
one or more side portions of the fastener head of the selected fastener;
one or more shank side portions of a fastener shank of the selected fastener; and
one or more tail end portions of a tail end of the selected fastener.

4. The automated fastener system of claim 1, wherein each of the one or more fasteners comprises one of, a bolt, a rivet, a screw, a pin, or a bushing.

5. The automated fastener system of claim 1, wherein each of the one or more fasteners is coated with a dry film lubricant coating.

6. The automated fastener system of claim 1, wherein the eddy current conductivity probe assembly integrated in the one or more shuttle cups, comprises:
one or more eddy current conductivity probes, each with one or more coils coupled to electrical wires, and the one or more eddy current conductivity probes configured to contact one of, one or more side portions of a fastener head of the selected fastener in the selected shuttle cup of the one or more shuttle cups, or one or more shank side portions of a fastener shank of the selected fastener in the selected shuttle cup;
an actuator coupled to each of the one or more eddy current conductivity probes, to move the one or more eddy current conductivity probes against the selected fastener; and
a sensor in a control box, the sensor coupled to the one or more eddy current conductivity probes via the electrical wires.

7. The automated fastener system of claim 1, wherein the eddy current conductivity probe assembly integrated in either, the two or more inspection gripper fingers, or the two or more end effector gripper fingers, comprises:
an eddy current conductivity probe, in each inspection gripper finger, or in each end effector gripper finger, each eddy current conductivity probe having one or more coils coupled to electrical wires, and the eddy current conductivity probe configured to contact one or more side portions of a fastener head of the selected fastener; and
a sensor in a control box, the sensor coupled to the eddy current conductivity probe via the electrical wires.

8. The automated fastener system of claim 1, wherein the eddy current conductivity probe assembly integrated in either, the inspection center shaft, or the end effector center shaft, comprises:
an eddy current conductivity probe having one or more coils coupled to electrical wires, and the eddy current conductivity probe configured to contact one or more top end portions of a fastener head of the selected fastener; and
a sensor in a control box, the sensor coupled to the eddy current conductivity probe via the electrical wires.

9. The automated fastener system of claim 1, wherein the automated fastener installation system further comprises the end effector coupled to one of, a robotic system, or a gantry system.

10. An automated fastener system having fastener conductivity testing for an aircraft fastener, the automated fastener system comprising:
an automated fastener holder assembly having one or more fastener holders holding and dispensing one or more aircraft fasteners, wherein each of the one or more aircraft fasteners is made of a base fastener material comprising, a metal material, including titanium, aluminum, nickel, steel, copper, silver, or zinc; or a metal alloy material, including a nickel-chromium alloy, brass, bronze, a titanium alloy, an aluminum alloy, a nickel alloy, a steel alloy, a copper alloy, a silver alloy, or a zinc alloy;
an automated fastener shuttle assembly having one or more shuttle cups, wherein a selected shuttle cup receives a selected aircraft fastener from the one or more fastener holders, and transports the selected aircraft fastener in the selected shuttle cup;
an automated fastener inspection system having an inspection center shaft, and two or more inspection gripper fingers configured to pick up the selected aircraft fastener from the selected shuttle cup, configured to grip and to inspect the selected aircraft fastener, and configured to release the selected aircraft fastener;
an automated delivery system having a delivery device configured to transport the selected aircraft fastener away from the automated fastener inspection system;
an automated fastener installation system having an end effector with an end effector center shaft, and two or more end effector gripper fingers configured to pick up the selected aircraft fastener from the delivery device transported by the automated delivery system, and configured to install the selected aircraft fastener in an aircraft structure;
an automated eddy current conductivity probe system comprising an eddy current conductivity probe assembly integrated in one of, the one or more shuttle cups, the inspection center shaft, the two or more inspection gripper fingers, the end effector center shaft, or the two or more end effector gripper fingers, the eddy current conductivity probe assembly contacting the selected aircraft fastener to perform the fastener conductivity testing and to obtain an electrical conductivity measurement of the selected aircraft fastener; and a processing system to process the electrical conductivity measurement, the processing system comprising a computer system with a computer having a computer console, and a computer software program implementing a control logic, wherein the control logic implemented by the computer software program compares the electrical conductivity measurement of the selected aircraft fastener against a predetermined electrical conductivity value range of a predetermined fastener material, to obtain a fastener material determination of the selected aircraft fastener, and to accept or to reject the selected aircraft fastener based on the fastener material determination.

11. The automated fastener system of claim 10, wherein the automated eddy current conductivity probe system comprises:

the eddy current conductivity probe assembly comprising:
one or more eddy current conductivity probes, each with one or more coils coupled to electrical wires; and
a sensor in a control box, the sensor coupled to the one or more eddy current conductivity probes via the electrical wires; and
a data connection to transmit the electrical conductivity measurement to the computer, the data connection comprising one of, a wired data connection, or a wireless data connection.

12. The automated fastener system of claim 10, wherein the eddy current conductivity probe assembly integrated in the one or more shuttle cups, comprises:

one or more eddy current conductivity probes, each with one or more coils coupled to electrical wires, and the one or more eddy current conductivity probes configured to contact one of, one or more side portions of a fastener head of the selected aircraft fastener in the selected shuttle cup of the one or more shuttle cups, or one or more shank side portions of a fastener shank of the selected aircraft fastener in the selected shuttle cup;
an actuator coupled to each of the one or more eddy current conductivity probes, to move the one or more eddy current conductivity probes against the selected aircraft fastener; and
a sensor in a control box, the sensor coupled to the one or more eddy current conductivity probes via the electrical wires.

13. The automated fastener system of claim 10, wherein the eddy current conductivity probe assembly integrated in either, the two or more inspection gripper fingers, or the two or more end effector gripper fingers, comprises:

an eddy current conductivity probe, in each inspection gripper finger, or in each end effector gripper finger, each eddy current conductivity probe having one or more coils coupled to electrical wires, and the eddy current conductivity probe configured to contact one or more side portions of a fastener head of the selected aircraft fastener; and
a sensor in a control box, the sensor coupled to the eddy current conductivity probe via the electrical wires.

14. The automated fastener system of claim 10, wherein the eddy current conductivity probe assembly integrated in either, the inspection center shaft, or the end effector center shaft, comprises:

an eddy current conductivity probe having one or more coils coupled to electrical wires, and the eddy current conductivity probe configured to contact one or more top end portions of a fastener head of the selected aircraft fastener; and a sensor in a control box, the sensor coupled to the eddy current conductivity probe via the electrical wires.

15. An automated method of performing fastener conductivity testing in an automated fastener system, the automated method comprising:

providing the automated fastener system comprising:
an automated fastener holder assembly holding and dispensing one or more fasteners, wherein each of the one or more fasteners is made of a base fastener material comprising, a metal material, including titanium, aluminum, nickel, steel, copper, silver, or zinc; or a metal alloy material, including a nickel-chromium alloy, brass, bronze, a titanium alloy, an aluminum alloy, a nickel alloy, a steel alloy, a copper alloy, a silver alloy, or a zinc alloy;
an automated fastener shuttle assembly having one or more shuttle cups, wherein a selected shuttle cup receives a selected fastener from the automated fastener holder assembly, and transports the selected fastener in the selected shuttle cup;
an automated fastener inspection system having an inspection center shaft, and two or more inspection gripper fingers configured to pick up, to inspect, and to release the selected fastener;
an automated delivery system having a delivery device configured to transport the selected fastener;
an automated fastener installation system having an end effector with an end effector center shaft, and two or more end effector gripper fingers configured to pick up the selected fastener from the delivery device transported by the automated delivery system, and configured to install the selected fastener in a structure;
an automated eddy current conductivity probe system comprising an eddy current conductivity probe assembly integrated in one of, the one or more shuttle cups, the inspection center shaft, the two or more inspection gripper fingers, the end effector center shaft, or the two or more end effector gripper fingers; and
a processing system comprising a computer system with a computer having a computer console, and a computer software program implementing a control logic;
performing the fastener conductivity testing on the selected fastener, by contacting the selected fastener with the eddy current conductivity probe assembly integrated in one of, the one or more shuttle cups, the inspection center shaft, the two or more inspection gripper fingers, the end effector center shaft, or the two or more end effector gripper fingers, to obtain an electrical conductivity measurement of the selected fastener;
using the control logic of the processing system to compare the electrical conductivity measurement of the selected fastener against a predetermined electrical conductivity value range of a predetermined fastener material, to obtain a fastener material determination of the selected fastener; and
accepting or rejecting the selected fastener based on the fastener material determination.

16. The automated method of claim 15, wherein performing the fastener conductivity testing on the selected fastener further comprises, performing the fastener conductivity testing on the selected fastener, where the eddy current conductivity probe assembly integrated in the one or more shuttle cups, comprises:

one or more eddy current conductivity probes, each with one or more coils coupled to electrical wires, and the one or more eddy current conductivity probes configured to contact one of, one or more side portions of a fastener head of the selected fastener in the selected shuttle cup of the one or more shuttle cups, or one or more shank side portions of a fastener shank of the selected fastener in the selected shuttle cup;

an actuator coupled to each of the one or more eddy current conductivity probes, to move the one or more eddy current conductivity probes against the selected fastener; and a sensor in a control box, the sensor coupled to the one or more eddy current conductivity probes via the electrical wires.

17. The automated method of claim 15, wherein performing the fastener conductivity testing on the selected fastener further comprises, performing the fastener conductivity testing on the selected fastener, where the eddy current conductivity probe assembly integrated in either, the two or more inspection gripper fingers, or the two or more end effector gripper fingers, comprises:

an eddy current conductivity probe, in each inspection gripper finger, or in each end effector gripper finger, each eddy current conductivity probe having one or more coils coupled to electrical wires, and the eddy current conductivity probe configured to contact one or more side portions of a fastener head of the selected fastener; and a sensor in a control box, the sensor coupled to the eddy current conductivity probe via the electrical wires.

18. The automated method of claim 15, wherein performing the fastener conductivity testing on the selected fastener further comprises, performing the fastener conductivity testing on the selected fastener, where the eddy current conductivity probe assembly integrated in either, the inspection center shaft, or the end effector center shaft, comprises:

an eddy current conductivity probe having one or more coils coupled to electrical wires, and the eddy current conductivity probe configured to contact one or more top end portions of a fastener head of the selected fastener; and a sensor in a control box, the sensor coupled to the eddy current conductivity probe via the electrical wires.

19. The automated method of claim 15, wherein providing the automated fastener system further comprises, providing the automated fastener system where the automated eddy current conductivity probe system comprises:

the eddy current conductivity probe assembly comprising:

one or more eddy current conductivity probes with one or more coils coupled to electrical wires; and a sensor in a control box, the sensor coupled to the one or more eddy current conductivity probes via the electrical wires; and a data connection to transmit the electrical conductivity measurement to the computer, the data connection comprising one of, a wired data connection, or a wireless data connection.

20. The automated method of claim 15, wherein providing the automated fastener system further comprises, providing the automated fastener system with the automated fastener installation system further comprising the end effector coupled to one of, a robotic system, or a gantry system.

* * * * *